United States Patent
Kang et al.

(10) Patent No.: US 10,333,340 B2
(45) Date of Patent: Jun. 25, 2019

(54) POWER SUPPLY DEVICE AND POWER SUPPLY SYSTEM INCLUDING THE SAME

(71) Applicant: LG ELECTRONICS INC., Seoul (KR)

(72) Inventors: Juwan Kang, Seoul (KR); Jaesung You, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 166 days.

(21) Appl. No.: 15/331,294

(22) Filed: Oct. 21, 2016

(65) Prior Publication Data

US 2017/0117746 A1    Apr. 27, 2017

(30) Foreign Application Priority Data

Oct. 22, 2015    (KR) .................. 10-2015-0147298

(51) Int. Cl.
*H02J 7/00*    (2006.01)
*H02J 9/00*    (2006.01)
(Continued)

(52) U.S. Cl.
CPC .............. *H02J 9/061* (2013.01); *H02J 3/383* (2013.01); *H02J 7/007* (2013.01); *H02J 7/35* (2013.01);
(Continued)

(58) Field of Classification Search
CPC .... H02J 9/061; H02J 9/062; H02J 7/35; H02J 3/383; H02J 7/007; Y02E 10/563; Y02E 10/566; Y02B 10/72
(Continued)

(56) References Cited

U.S. PATENT DOCUMENTS 7,566,232 B2 *   7/2009   Iida ...................... H02J 7/0045
                                                              363/37
8,455,752 B2 *   6/2013   Korman ................. H02S 40/32
                                                              136/251
(Continued)

FOREIGN PATENT DOCUMENTS

KR    10-2011-0068640 A    6/2011
KR    10-2013-0091844 A    8/2013
(Continued)

*Primary Examiner* — Richard Tan
(74) *Attorney, Agent, or Firm* — Birch, Stewart, Kolasch & Birch, LLP

(57) ABSTRACT

The present invention relates to a power supply device and a power supply system including the same. The power supply device includes a first connector to receive an input alternating current (AC) voltage, a second connector to output a first output AC voltage to a grid, a third connector connectable with a plug of an external electronic device, a voltage conversion unit to convert a first direct current (DC) voltage stored in a battery into an AC voltage, and a controller configured to control the first output AC voltage based on the input AC voltage not to be supplied to the grid when grid power outage occurs while the first AC voltage is output to the grid, and control the input AC voltage to be output to the third connector as a second output AC voltage, or control the input AC voltage to be converted into the first DC voltage and the first DC voltage to be supplied to the battery. Thereby, the input AC voltage generated by the solar module may be utilized when grid power outage occurs.

18 Claims, 22 Drawing Sheets

(51) Int. Cl.
*H02J 9/06* (2006.01)
*H02J 3/38* (2006.01)
*H02J 7/35* (2006.01)

(52) U.S. Cl.
CPC ............... *H02J 9/062* (2013.01); *Y02B 10/72* (2013.01); *Y02E 10/563* (2013.01); *Y02E 10/566* (2013.01)

(58) Field of Classification Search
USPC .......................................................... 307/65
See application file for complete search history.

(56) References Cited

U.S. PATENT DOCUMENTS

| | | | |
|---|---|---|---|
| 8,716,892 B2 * | 5/2014 | Min | H02J 1/00 307/64 |
| 2011/0140648 A1 | 6/2011 | Lee | |
| 2013/0207466 A1 | 8/2013 | Lee et al. | |
| 2014/0217826 A1 * | 8/2014 | Oguchi | H02J 7/35 307/46 |
| 2016/0094087 A1 * | 3/2016 | Satake | H02J 3/383 307/23 |

FOREIGN PATENT DOCUMENTS

| | | |
|---|---|---|
| KR | 10-1378573 B1 | 4/2014 |
| KR | 10-1473896 B1 | 12/2014 |
| KR | 10-1511629 B1 | 4/2015 |

\* cited by examiner

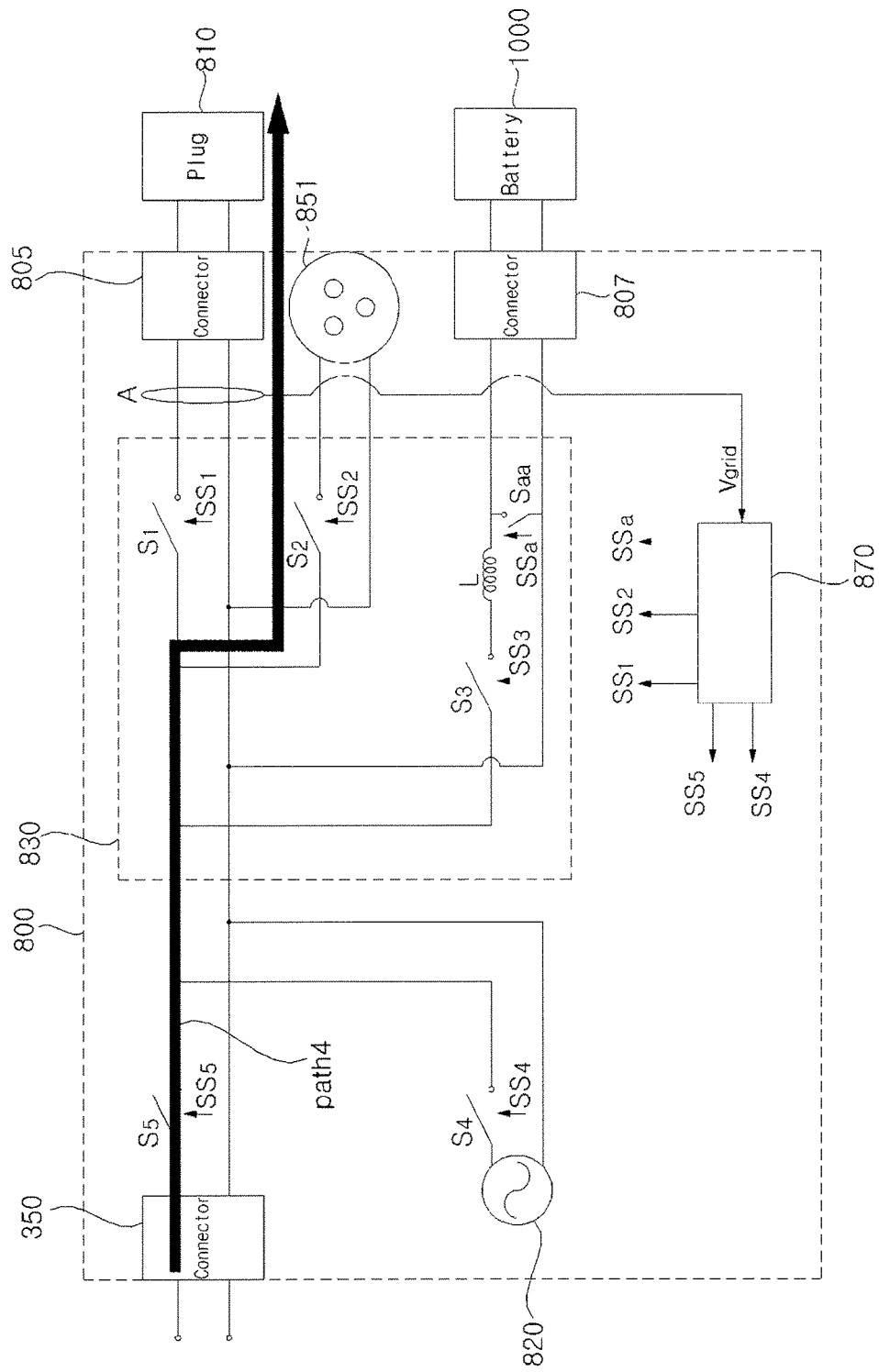

POWER SUPPLY DEVICE AND POWER SUPPLY SYSTEM INCLUDING THE SAME

CROSS-REFERENCE TO RELATED APPLICATION

This application claims the priority benefit of Korean Patent Application No. 10-2015-0147298, filed on Oct. 22, 2015 in the Korean Intellectual Property Office, the disclosure of which is incorporated herein by reference.

BACKGROUND OF THE INVENTION

1. Field of the Invention

The present invention relates to a power supply device and a power supply system including the same, and more particularly, to a power supply device capable of utilizing the input alternating current (AC) voltage generated by a solar module even if voltage outage occurs in a grid and a power supply system including the same.

2. Description of the Related Art

As existing energy resources such as petroleum and coal are depleted, attention to alternative energy sources to replace the existing energy sources has recently increased. Among alternative energy sources, a solar cell has come into the spotlight as a future generation battery, which directly converts sunlight into electrical energy using semiconductor devices.

A solar module may refer to connection of solar cells in series or in parallel for photovoltaic power generation.

Methods for providing power to a grid using a direct current (DC) voltage generated by the solar module have been proposed.

Research has been conducted on various methods for stably utilizing a DC voltage generated by a solar module when grid power outage occurs.

SUMMARY OF THE INVENTION

Therefore, the present invention has been made in view of the above problems, and it is an object of the present invention to provide a power supply device capable of utilizing an input AC voltage generated by a solar module even when power outage occurs in a grid and a power supply system including the same.

In accordance with an aspect of the present invention, the above and other objects can be accomplished by the provision of a power supply device including a first connector to receive an input alternating current (AC) voltage, a second connector to output a first output AC voltage to a grid, a third connector connectable with a plug of an external electronic device, a voltage conversion unit to convert a first direct current (DC) voltage stored in a battery into an AC voltage, and a controller configured to control the first output AC voltage based on the input AC voltage not to be supplied to the grid when grid power outage occurs while the first AC voltage is output to the grid, and control the input AC voltage to be output to the third connector as a second output AC voltage, or control the input AC voltage to be converted into the first DC voltage and the first DC voltage to be supplied to the battery.

In accordance with another aspect of the present invention, there is provided a power supply device including a first connector to receive an input alternating current (AC) voltage, a second connector to output a first output AC voltage to a grid, a third connector connectable with a plug of an external electronic device, a voltage conversion unit to convert a first direct current (DC) voltage stored in a battery into an AC voltage, a controller configured to control, when the plug of the external electronic device is connected to the third connector during the grid power outage, the received input AC voltage to be output to the third connector as the second output AC voltage, or a second DC voltage stored in the battery to be converted into an AC voltage and the converted AC voltage to be output to the third connector as the second output AC voltage.

In accordance with a further aspect of the present invention, there is provided a power supply system including a solar module having a solar cell module including a solar cell for generating a direct current (DC) voltage, a power supply device to output a first output alternating current (AC) voltage to the grid based on a converted input AC voltage based on the DC voltage or to, when a plug of an external electronic device is connected, output the input AC voltage as a second output AC voltage or convert the input AC voltage into a first DC voltage and output the first DC voltage, wherein, when grid power outage occurs, the power supply device does not supply the first output AC voltage based on the input AC voltage to the grid, but outputs the input AC voltage as the second output AC voltage or converts the input AC voltage into the first DC voltage and supply the first DC voltage to the battery.

BRIEF DESCRIPTION OF THE DRAWINGS

The above and other objects, features and other advantages of the present invention will be more clearly understood from the following detailed description taken in conjunction with the accompanying drawings, in which:

FIGS. 6A to 6F illustrate various operations of the power supply device of FIG. 5;

DETAILED DESCRIPTION OF THE PREFERRED EMBODIMENTS

Reference will now be made in detail to the preferred embodiments of the present invention, examples of which are illustrated in the accompanying drawings. Wherever possible, the same reference numbers will be used throughout the drawings to refer to the same or like parts.

As used herein, the suffixes "module" and "unit" are added or used interchangeably to facilitate preparation of this specification and are not intended to suggest distinct meanings or functions. Accordingly, the terms "module" and "unit" may be used interchangeably.

Figure 1:
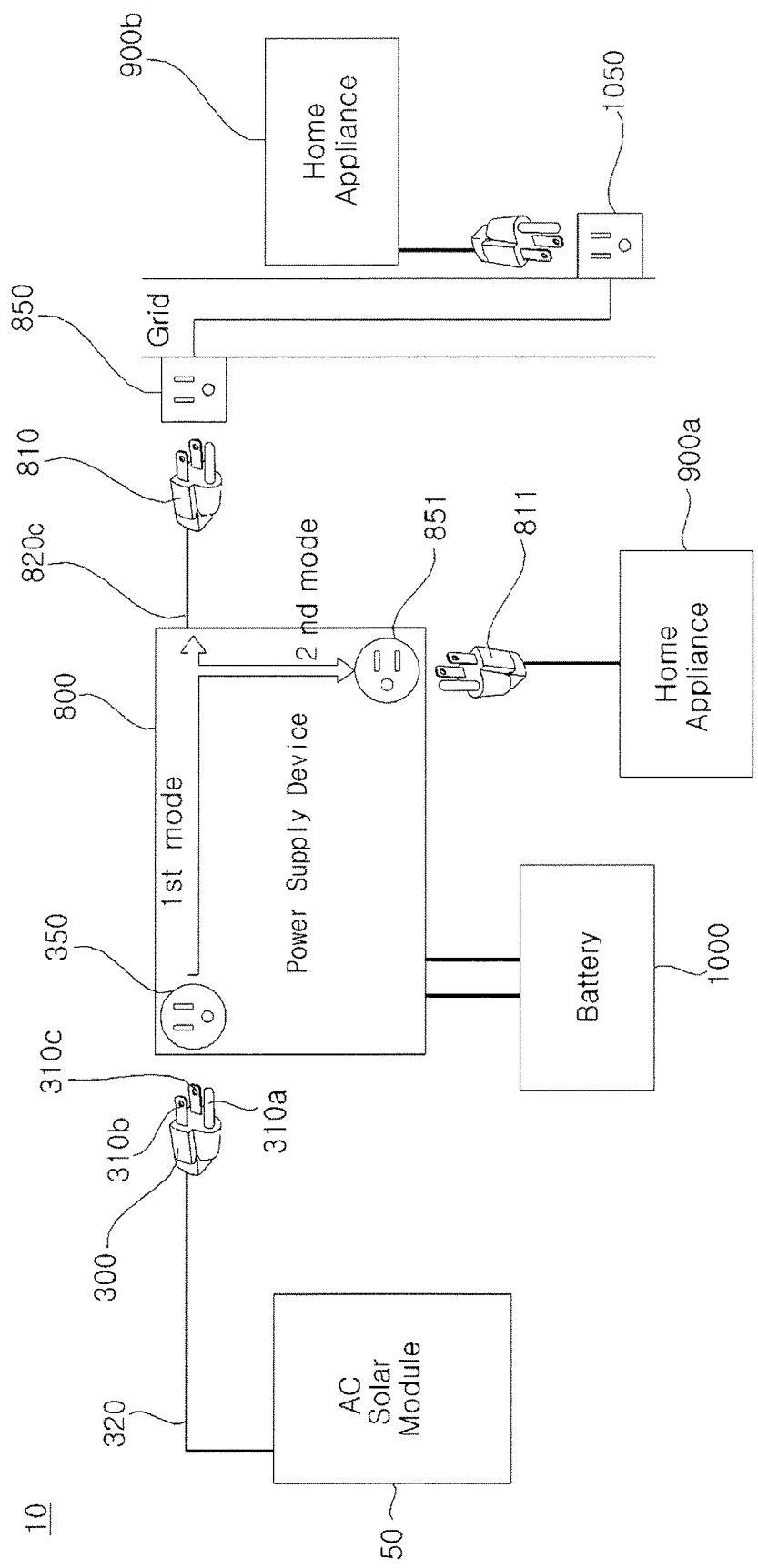
FIG. 1 illustrates an example of a power supply system according to an embodiment of the present invention.

FIG. 1 illustrates a power supply system according to an embodiment of the present invention.

Referring to FIG. 1, a power supply system 10 of FIG. 1 may include a solar module 50, a power supply device 800, a battery 1000, and a grid. The power supply system 10 may further include home appliances 900a, 900b.

The solar module 50 may convert a DC voltage generated by the solar cell module into a DC voltage or an AC voltage and output the converted DC voltage or AC voltage.

In the case where the solar module 50 outputs the DC voltage, the power supply system 10 of the FIG. 1 may further include a separate inverter device (not shown).

In FIG. 1, the solar module 50 is illustrated as being an AC module for outputting an AC voltage. For simplicity, in the following description, the solar module 50 is assumed to be an AC module.

The AC voltage output from the solar module 50 may be applied to a first connector 350 in the power supply device 800 via a cable 320 and a plug 300 as an input AC voltage.

The plug 300 may include a first power line 320b, a second power line 320c, and a ground line 320a, as shown in the figure.

When power outage does not occur, the power supply device 800 may be set to operate in a first mode to output an input AC voltage input to the first connector 350 to the grid via a second connector 805 (see FIG. 3) as a first output AC voltage.

Figure 3:
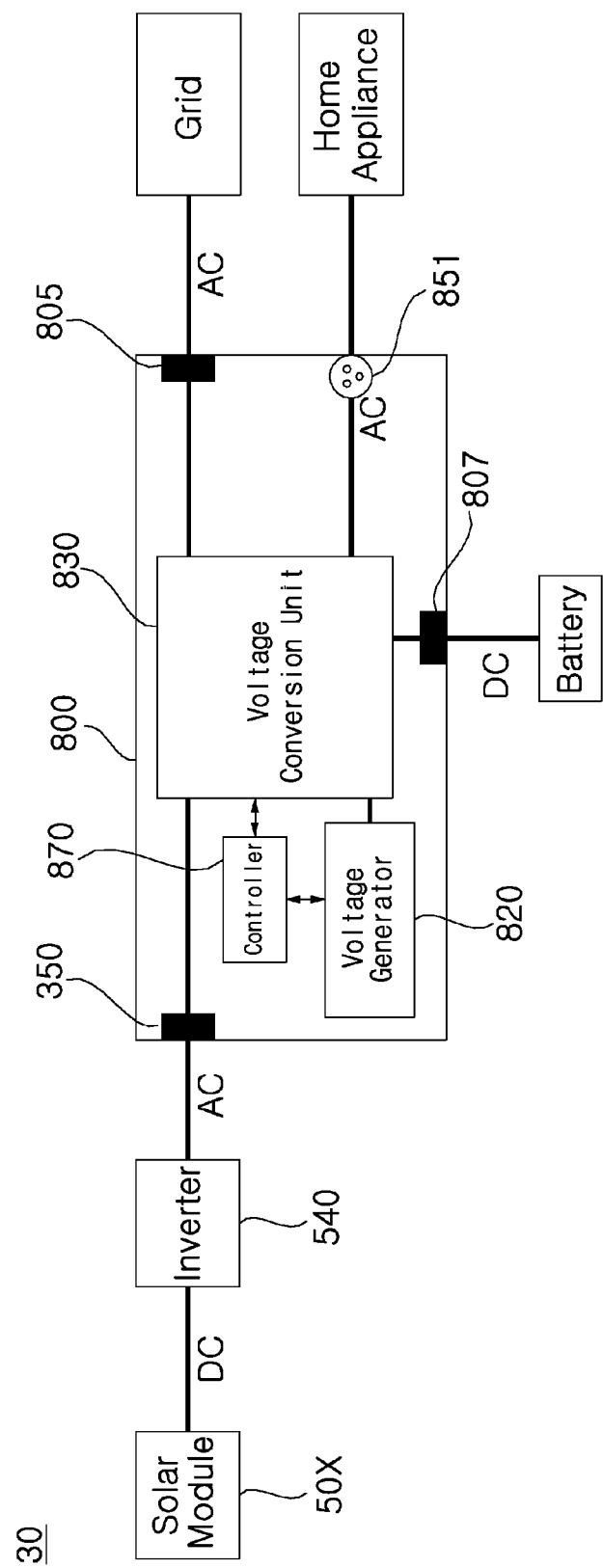
FIG. 3 illustrates an example of the power supply device of FIG. 1 or 2.

The power supply device 800 may include cable 820c and a plug 810, which are electrically connected to the second connector 805 (see FIG. 3). The plug 810 may be electrically connected to the outlet 850, which is connected to the grid. Thereby, the input AC voltage input to the first connector 350 may be supplied to the grid.

Since the voltage from the solar module 50 can be supplied to the grid as described above, power from the solar module 50 is used to drive the home appliance 900b.

When power outage does not occur, the power supply device 800 may be set to operate in a second mode to output the input AC voltage input to the first connector 350 via a third connector 851 as a second output AC voltage.

In particular, when the plug of the home appliance 900a is connected to the third connector 851, the power supply device 800 may be set to the second mode to output the input AC voltage input to the first connector 350 via the third connector 851 as the second output AC voltage. Thereby, power from the solar module 50 may be used to drive the home appliance 900a.

The present invention proposes various methods for utilizing the input AC voltage input to the first connector 350 when grid power outage occurs.

According to an embodiment of the present invention, if grid power outage occurs while the first output voltage based on the input AC voltage is output, the power supply device 800 may control the first AC output voltage, which is based on the input AC voltage, not to be supplied to the grid, control the input AC voltage to be output to the third connector 851 as the second output AC voltage, or control the input AC voltage to be converted into a first DC voltage and the first DC voltage to be supplied to the battery 1000. Thereby, the input AC voltage generated by the solar module may be utilized when grid power outage occurs.

According to an embodiment of the present invention, if the plug of an external electronic device is connected to the third connector 851 during grid power outage, the power supply device 800 may control the received input AC voltage to be output to the third connector 851 as the second output AC voltage, or control a second DC voltage stored in the battery 1000 to be converted into an AC voltage and the AC voltage to be output to the third connector 851 as the second output AC voltage. Thereby, the external electronic device may stably operate even if grid power outage occurs.

The solar module 50, which is an AC module, or a separate inverter device (not shown) may be designed to stop operating in order to protect the solar module 50 or the inverter device (not shown) when grid power outage occurs.

In this case, when grid power outage occurs, power generated by the solar module 50 or the separate inverter device (not shown) may fail to be supplied to the power supply device 800.

To address this issue, the power supply device 800 may control the power generator 820 (see FIG. 3) to generate an AC voltage waveform. Thereby, the power supply device 800 may stably and continuously receive the input AC voltage via the first connector 350 even if grid power outage occurs.

Figure 2:
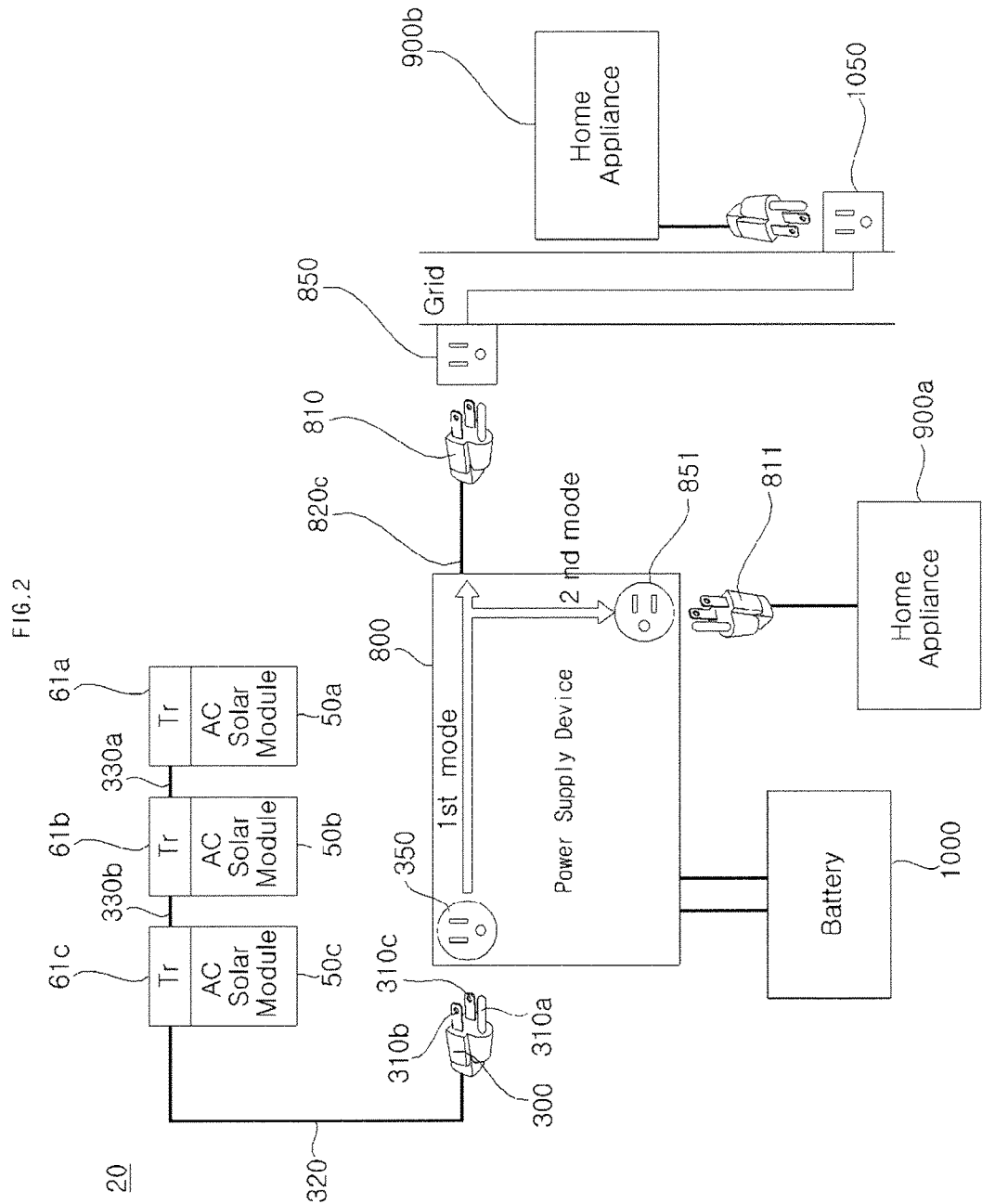
FIG. 2 illustrates another example of a power supply system according to an embodiment of the present invention.

FIG. 2 illustrates another example of a power supply system according to an embodiment of the present invention.

FIG. 2 is similar to FIG. 1, but is different from the FIG. 1 in that an input AC voltage input to the power supply device 800 is not from one solar module 50 (see FIG. 1), but from a plurality of solar modules 50a, 50b, 50c.

The solar modules 50a, 50b, 50c may be connected in parallel by trunk cables 61a, 61b, 61c. Among the solar modules, the third solar module 50c may include a cable 320, and a plug 300.

Operation of the power supply device 800 is similar to the example of FIG. 1, and thus a description thereof will be omitted.

While FIGS. 1 and 2 illustrate that the input AC voltage input to the power supply device 800 is based on the voltage output from the solar module 50 or the solar modules 50a, 50b, 50c, embodiments of the present invention are not limited thereto. Various examples of AC voltage including an AC voltage generated by wind power and an AC voltage generated by geothermal power may be possible.

FIG. 3 illustrates an example of the power supply device of FIG. 1 or 2.

The power supply device 800 may include a first connector 350, a second connector 805, a third connector 851, a fourth connector 807, a power generator 820, a power converter 830, and a controller 870.

The first connector 350 may receive an input AC voltage from, for example, the solar module 50.

The second connector 805 may output a first output AC voltage to the grid.

The third connector 851 may be connected with the plug of an external electronic device.

The fourth connector 807 may be electrically connected to the battery 1000.

The power generator 820 may generate an AC voltage waveform. In particular, when grid power outage occurs, the power generator 820 may generate an AC voltage waveform to continuously receive the input AC voltage.

The power converter 830 may convert a first DC voltage stored in the battery 1000 into an AC voltage. Alternatively, the power converter 830 may convert the input AC voltage into a second DC voltage. Alternatively, the power converter 830 may convert an AC voltage from the grid into a third DC voltage.

If grid power outage occurs while the first output AC voltage based on the input AC voltage is output to the grid, the controller 870 may control the first AC voltage, which is based on the input AC voltage, not to be supplied to the grid, control the input AC voltage to be output to the third connector 851 as the second output AC voltage, or control the input AC voltage to be converted into a first DC voltage and the first DC voltage to be supplied to the battery 1000.

If grid power outage occurs, the controller 870 may control the power generator 820 to generate an AC voltage waveform in order to continuously receive the input AC voltage.

If the plug of an external electronic device is connected to the third connector 851 during grid power outage, the controller 870 may control the received input AC voltage to be output to the third connector 851 as the second output AC voltage, or control the second DC voltage stored in the battery 1000 to be converted into an AC voltage and the converted AC voltage to be output to the third connector 851 as the second output AC voltage.

If the plug of the external electronic device is not connected to the third connector 851 during grid power outage, or if the voltage level of the battery 1000 is below a first level during grid power outage, the controller 870 may control the input AC voltage to be converted into a first DC voltage and the converted first DC voltage to be stored in the battery 1000.

If the peak value of the input AC voltage is greater than or equal to a first peak value while grid power outage occurs and the plug of an external electronic device is connected to the third connector 851, the controller 870 may control the input AC voltage to be output to the third connector 851 as the second output AC voltage. If the voltage level of the battery 1000 is higher than or equal to a second level while grid power outage occurs and the plug of the external electronic device is connected to the third connector 851, the controller 870 may control the second DC voltage stored in the battery 1000 to be converted into an AC voltage and the converted AC voltage to be output to the third connector 851 as the second output AC voltage.

When grid power outage ends, the controller 870 may control the received input AC voltage to be output to the second connector 805 as the first output AC voltage.

If the plug of an external electronic device is connected to the third connector 851 when grid power outage ends, the controller 870 may control the received input AC voltage to be output to the third connector 851 as the second output AC voltage.

If the plug of an external electronic device is connected to the third connector 851 and the peak value of the input AC voltage is less than or equal to a predetermined value when the grid power outage ends, the controller 870 may control the DC voltage stored in the battery 1000 to be converted into an AC voltage and the converted AC voltage to be output to the third connector 851 as the second output AC voltage, or control the AC voltage from the grid to be output to the third connector 851 as the second output AC voltage.

Figure 4:
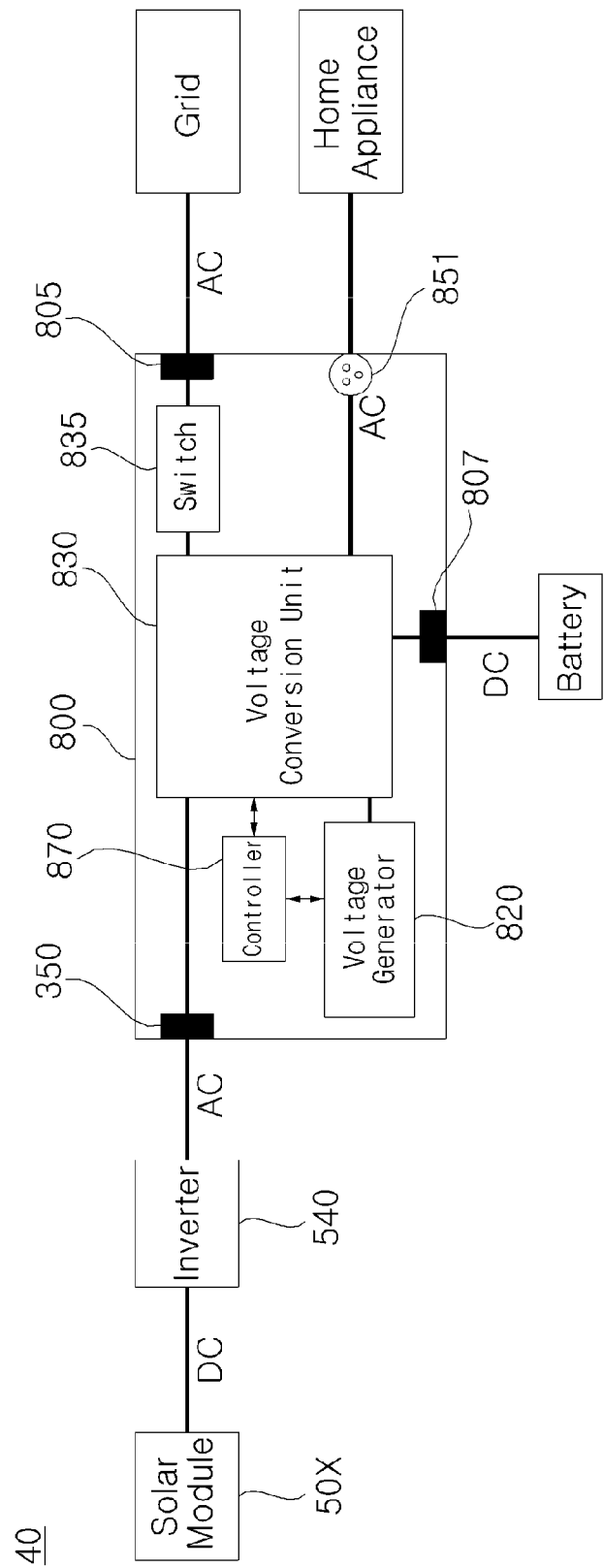
FIG. 4 illustrates another example of the power supply device of FIG. 1 or 2.

FIG. 4 is another example of the power supply device of FIG. 1 or 2.

FIG. 4 is similar to FIG. 3, but is different from FIG. 3 in that the power converter 830 is further provided in the power supply device 800.

The power supply device 800 may further include a switch 835 for performing a switching operation to electrically connect the second connector 805 and the grid.

When grid outage occurs, the controller 870 may control the switch 835 to be turned off.

For example, if a detection means (not shown) for detecting a voltage for the grid is provided, when the grid voltage is about 0 V, the controller 870 may control the switch 835 to be turned off, determining that grid power outage has occurred.

As another example, if the peak value of the AC power for the grid is less than or equal to a second peak value, the controller 870 may control the switch 870 to be turned off.

For the commercial AC voltage of 120 V, the peak value is about 170 V. For the commercial AC voltage of 220 V, the peak value is about 320 V.

For example, for the commercial AC voltage output of 120 V, if the detected peak value of the grid is less than about 100 V, the controller 870 may determine that the grid is unstable.

As another example, for the commercial AC voltage output of 220 V, if the detected peak value of the grid is less than about 270 V, the controller 870 may determine that the grid is unstable.

As such, the controller 870 may control the switch 835 to be turned off if power outage does not occur but the commercial AC voltage supplied to the grid is unstable.

In addition, the controller 870 may perform control operation such that the input AC voltage is utilized in charging the battery 1000 and operating the home appliance 900*b*.

Figure 5:
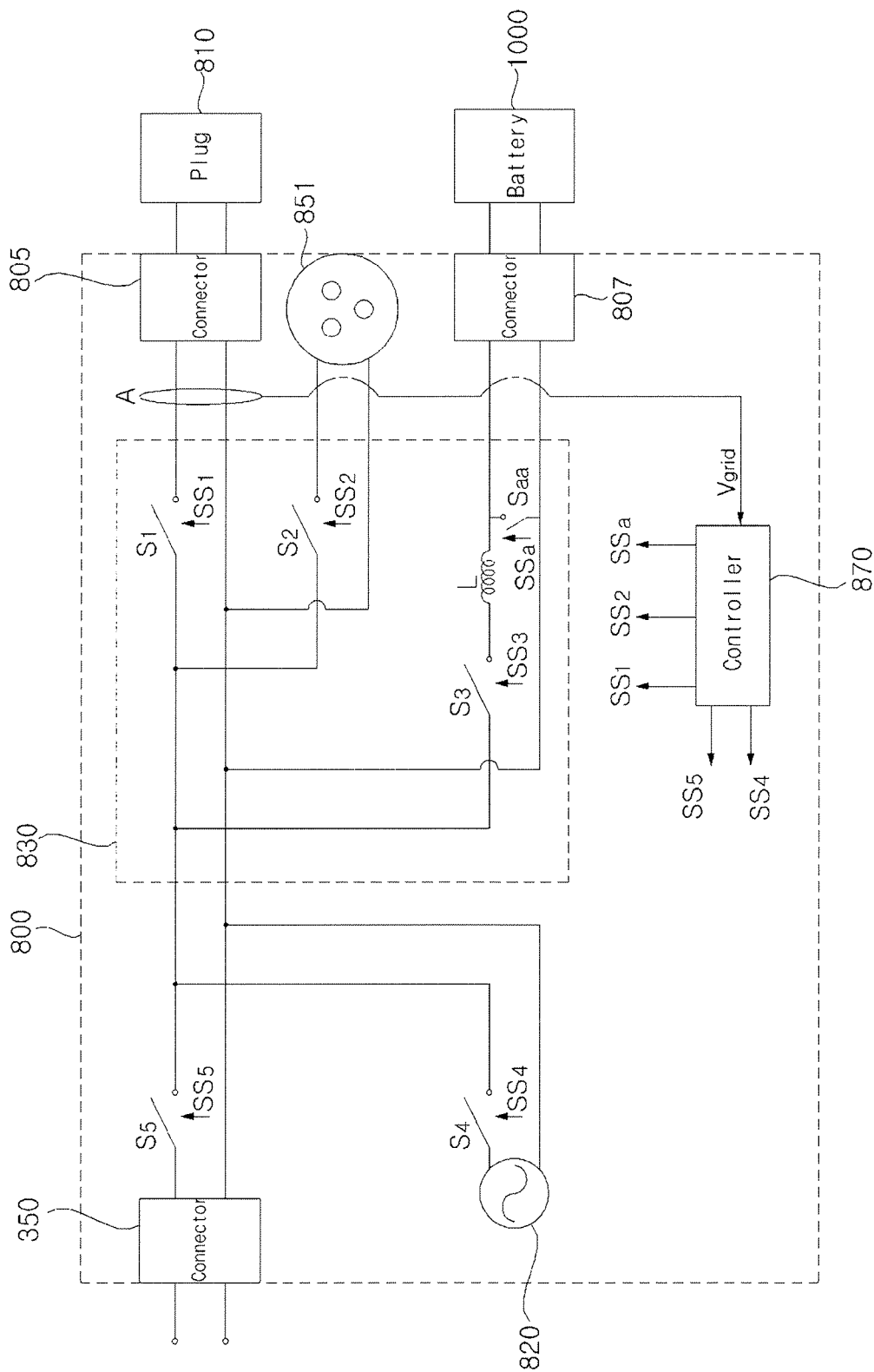
FIG. 5 is an internal circuit diagram illustrating the power supply device of FIG. 3.

FIG. 5 is an internal circuit diagram illustrating the power supply device of FIG. 3.

Referring to FIG. 5, the power converter 830 in the power supply device 800 may include a first switching device S1 for switching electrical connection to the second connector 805, a second switching device S2 for switching electrical connection to the third connector 851, a third switching device S3 for switching electrical connection to the battery 1000, an inductor L having one end connected to the third switching device S3, and a power conversion switching device Saa having one end connected to the inductor L.

The power supply device 800 may further include a power generator 820 for generating an AC voltage waveform, a fourth switching device S4 having one end connected to the power generator 820, and a fifth switching device S5 having one end connected to the first connector 350.

The controller 870 may output switching signals Ss1 to Ss5, Ssa for controlling switch operations of the first to fifth switching device S1 to S5 and the power conversion switching device Sa.

If the first switching device S1 and the fifth switching device S5 are turned on, the input AC voltage may be supplied to the grid via the second connector 805 as the first output AC voltage.

If the third switching device S3 is turned on and the first switching device S1 is turned on, the second DC voltage stored in the battery 1000 may be converted into an AC voltage and the converted AC voltage may be supplied to the grid via the second connector 805 as the first output AC voltage.

If the first switching device S1 and the third switching device S3 are turned on, the AC voltage from the grid is converted into the a DC voltage, and the converted DC voltage may be supplied to the battery 1000 via the fourth connector 807.

If the fifth switching device S5 and the second switching device S2 are turned on, the input AC voltage may be output to the third connector 851 as the second output AC voltage.

Thus, when the plug of the home appliance 900*a* is connected to the third connector 851, the home appliance 900*a* may be driven by the power supply device 800.

In particular, when power outage occurs, the fifth switching device S5 and the second switching device S2 are turned on. Thereby, the home appliance 900*a* connected to the third connector 851 may be driven by the power supply device 800.

If the fifth switching device S5 and the third switching device S3 are turned on, the input AC voltage may be converted into a DC voltage, and the converted DC voltage may be output supplied to the battery 1000 via the fourth connector 807.

Thereby, when grid power outage occurs, the DC voltage may be stored in the battery 1000.

If the third switching device S3 is turned on, and the second switching device S2 is turned on, the second DC voltage stored in the battery 1000 may be converted into an AC voltage, and the converted AC voltage may be output to the third connector 851 as the second output AC voltage.

Thereby, if the plug of the home appliance 900*a* is connected to the third connector 851 during grid power outage, the second switching device S2 may be driven by the power supply device 800.

FIGS. 6A to 6F illustrate various operations of the power supply device of FIG. 5.

Figure 6A:
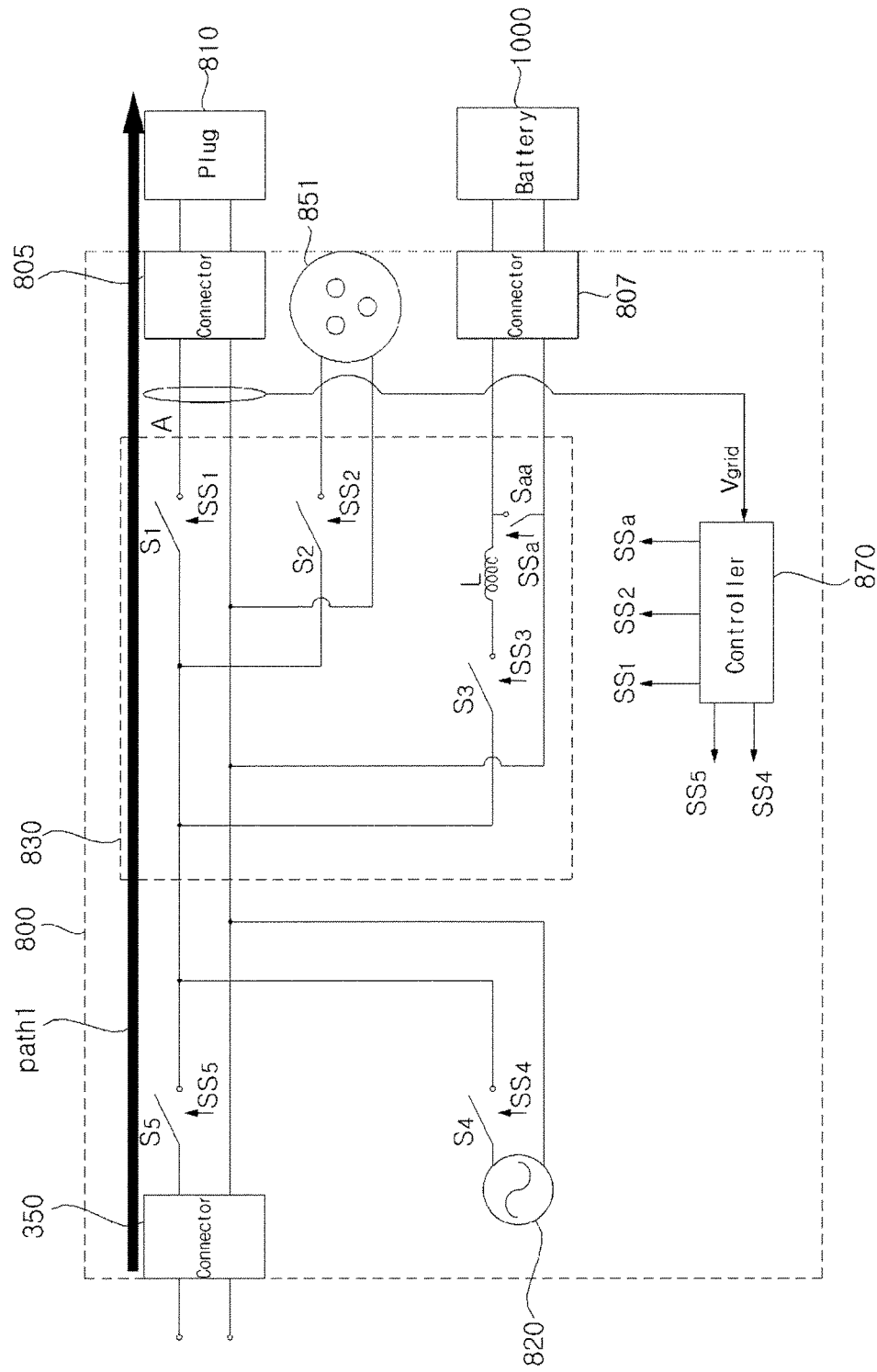
Figure 6B:
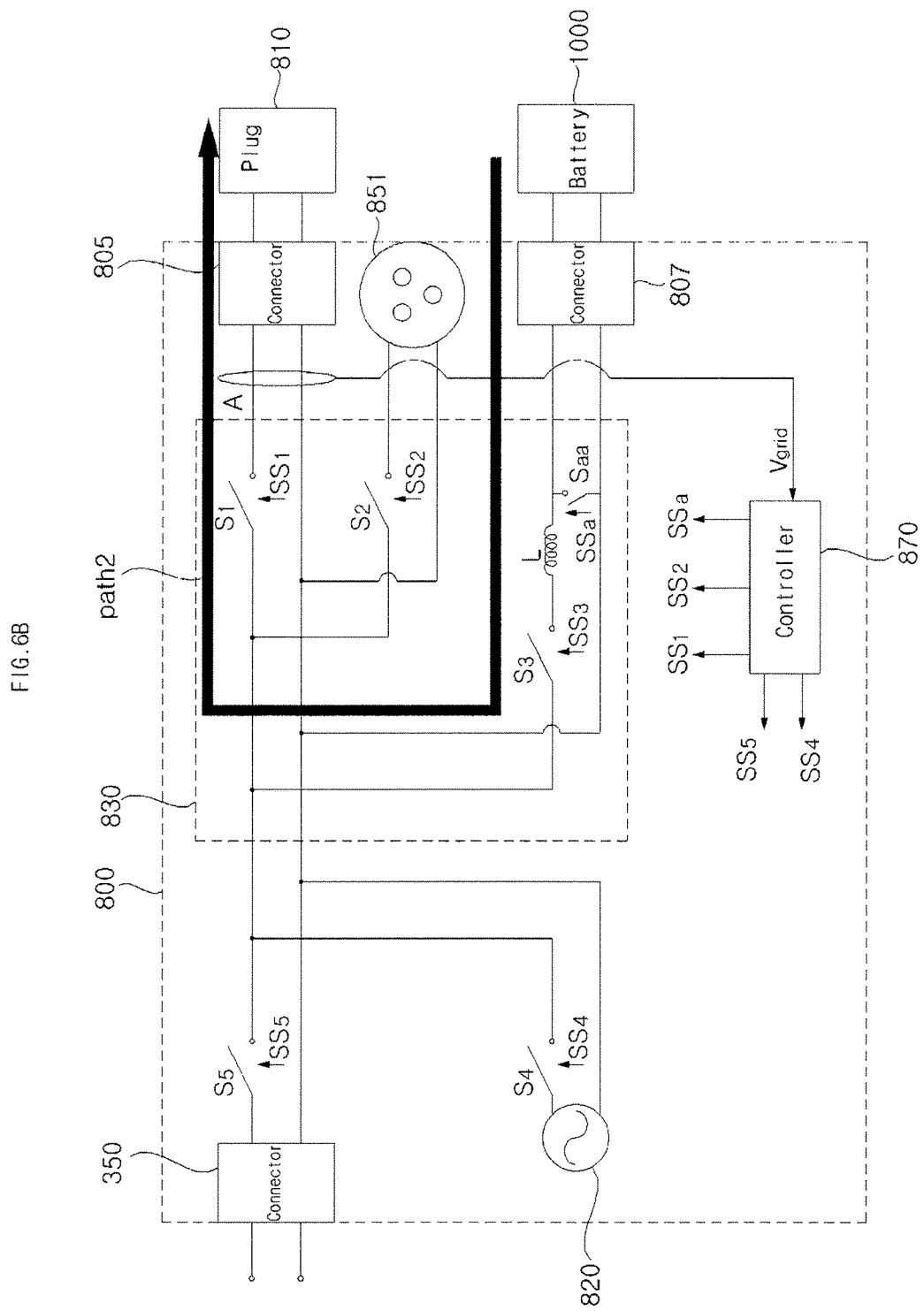
Figure 6C:
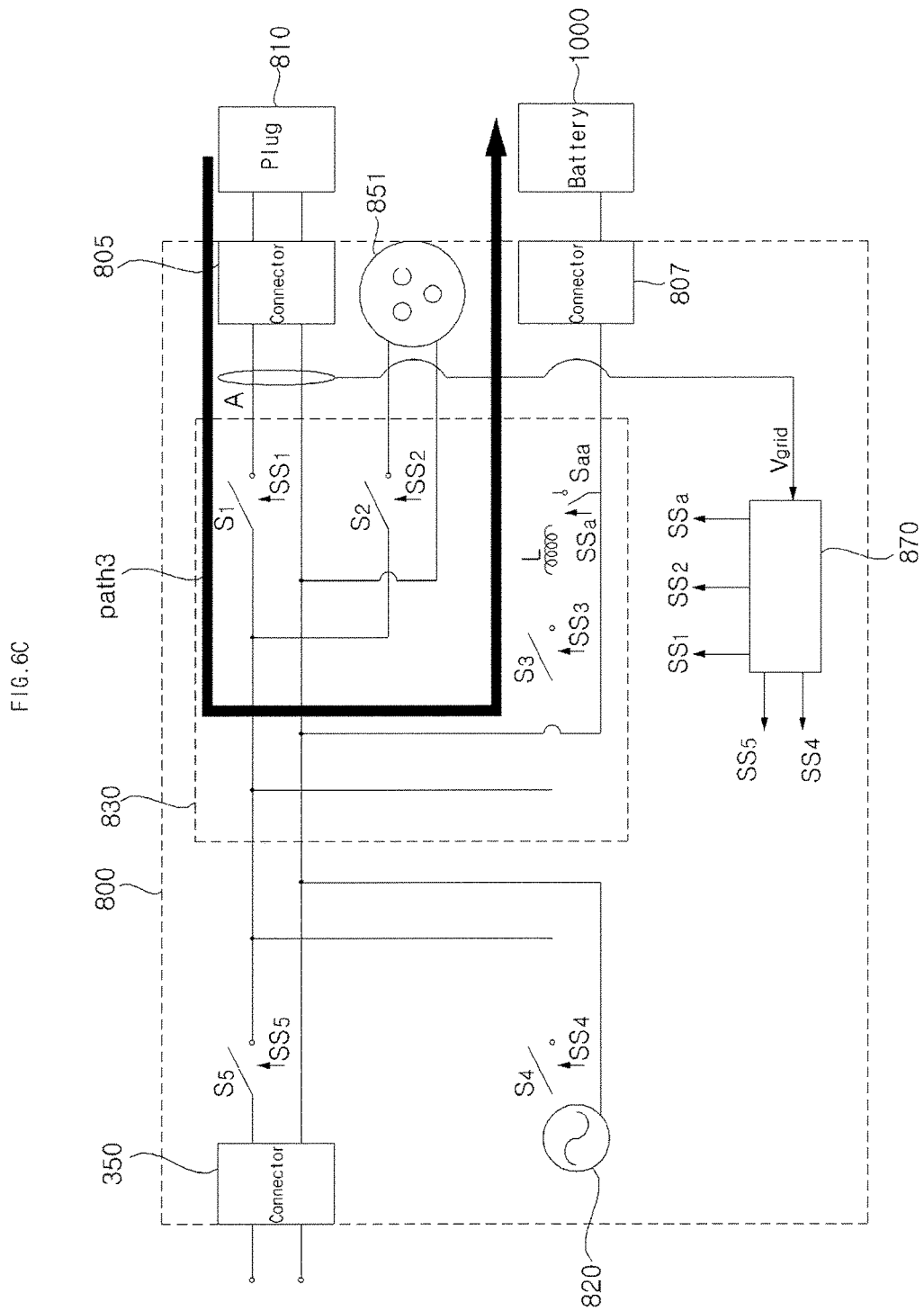

FIGS. 6A to 6C illustrate operation of a power conversion device 800 in a normal situation in which grid power outage does not occur.

As shown in FIG. 6A, if the first switching device S1 and the fifth switching device S5 are turned on, the input AC voltage may be supplied to the grid via the second connector 805 as the first output AC voltage.

As shown FIG. 6B, if the third switching device S2 and the first switching device S1 are turned on, the second DC voltage stored in the battery 1000 may be converted into an AC voltage, and the converted AC voltage may be supplied to the grid via the second connector 805 as the first output AC voltage.

As shown in FIG. 6C, if the first switching device S1 and the third switching device S3 are turned on, the AC voltage from the grid may be converted into a DC voltage, and the converted DC voltage may be supplied to the battery 1000 via the fourth connector 807.

Figure 6E:
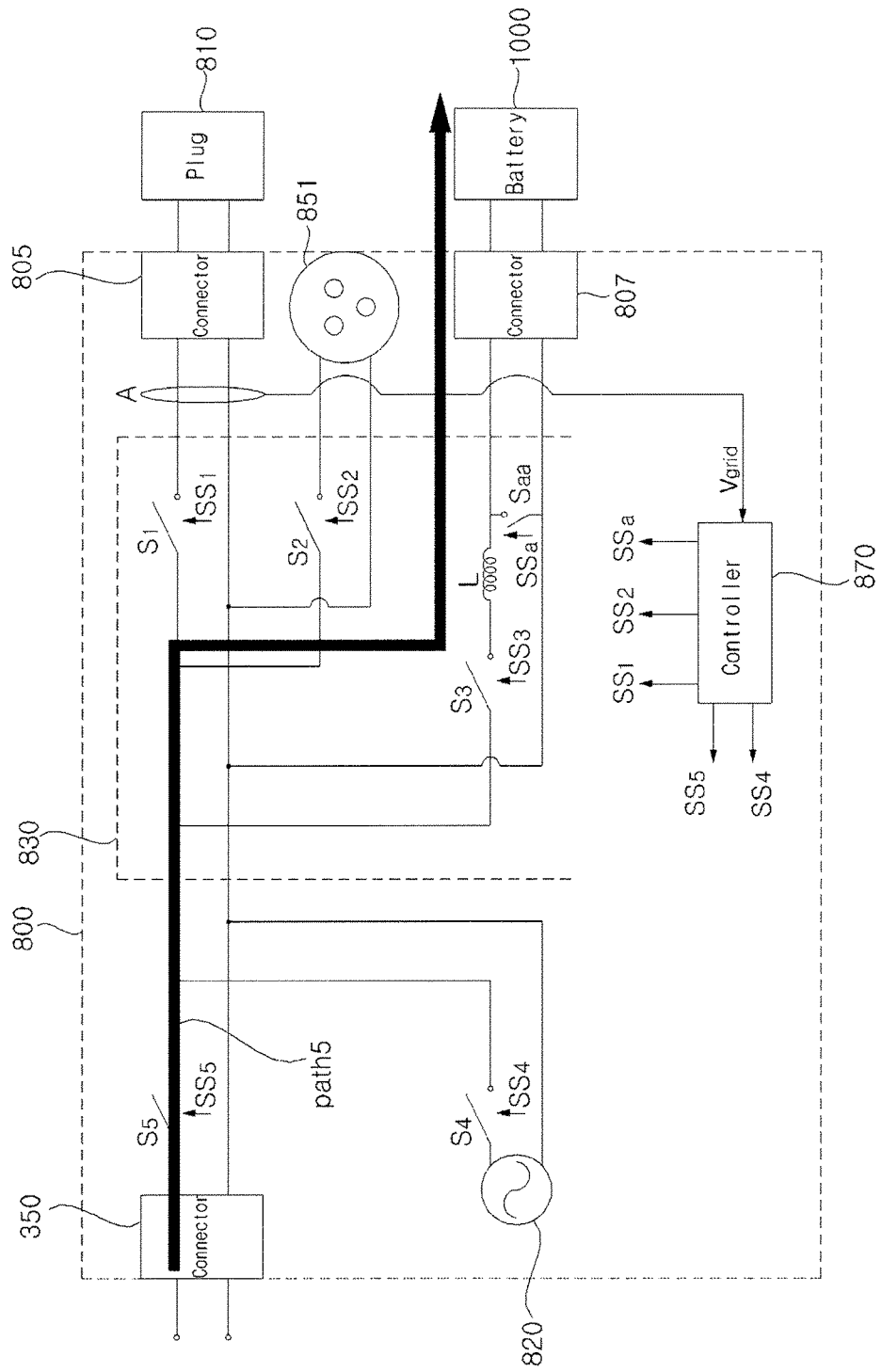
Figure 6F:
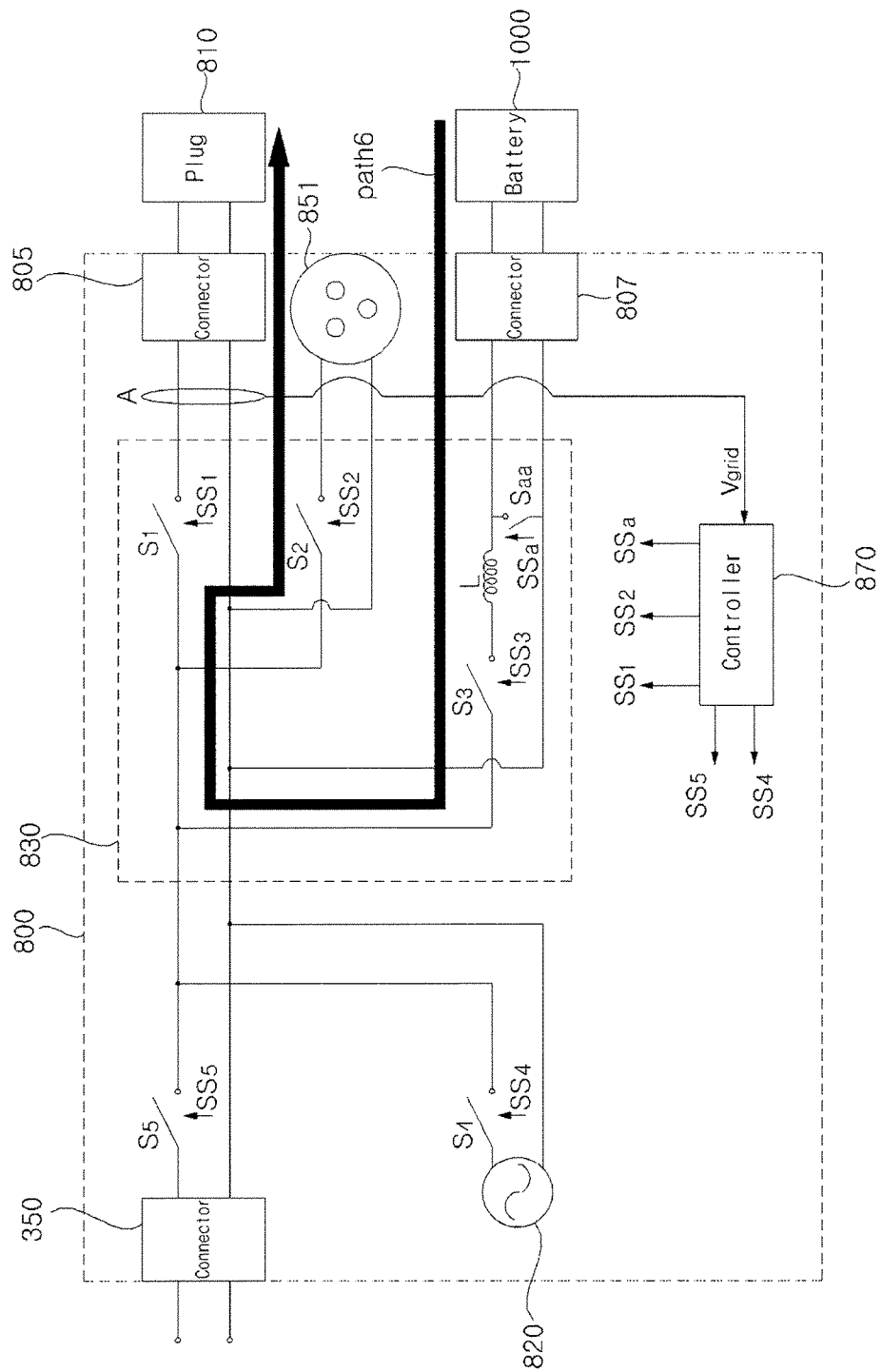

Next, FIGS. 6D to 6F illustrate operation of the power conversion device 800 performed when grid power outage occurs or the grid is unstable.

As shown in FIG. 6D, if the fifth switching device S5 and the second switching device S2 are turned on when grid power outage occurs, the input AC voltage may be output to the third connector 815 as the second output AC voltage.

Thereby, when the plug of the home appliance 900*a* is connected to the third connector 851, the home appliance 900*a* may be driven by the power supply device 800.

If grid power outage occurs while the first output AC voltage based on the input AC voltage is output to the grid, the controller 870 may control the first output AC voltage, which is based on the input AC voltage, not to be supplied to the grid, and control the input AC voltage to be output to the third connector 851 as the second output AC voltage, as shown in FIG. 6D.

Thereby, the input AC voltage generated by, for example, a solar module may be utilized when grid power outage occurs.

In particular, if the plug of the external electronic device is connected, the input AC voltage may be output to the third connector 851 as the second output AC voltage. Thereby, the external electronic device may be stably operated even if grid power outage occurs.

If the peak value of the input AC voltage is greater than or equal to a first peak value while grid power outage occurs and the plug of an external electronic device is connected to the third connector 851, the controller 870 may control the input AC voltage to be output to the third connector 851 as the second output AC voltage, as shown in FIG. 6D.

If grid power outage occurs, the controller 870 may control the power generator 820 to generate an AC voltage waveform in order to continuously receive the input AC voltage.

Next, as shown in FIG. 6E, if the fifth switching device S5 and the third switching device S3 are turned on when grid power outage occurs, the input AC voltage may be converted into a DC voltage and the converted DC voltage may be supplied to the battery 1000 via the fourth connector 807.

If grid power outage occurs while the first output AC voltage based on the input AC voltage is output, the controller 870 may control the first output AC voltage based on the first information not to be supplied to the grid, and control the input AC voltage to be converted into a first DC voltage and the first DC voltage to be supplied to the battery 1000, as shown in FIG. 6E.

Thereby, when grid power outage occurs, a DC voltage may be stored in the battery 1000.

If the plug of an external electronic device is not connected to the third connector 851 while grid power outage occurs, or if the voltage level of the battery 1000 is lower than or equal to a first level, the controller 870 may control the input AC voltage to be converted into a first DC voltage and the first DC voltage to be supplied to the battery 1000, as shown in FIG. 6E.

Next, as shown in FIG. 6F, if the third switching device S3 and the second switching device S2 are turned on when grid power outage occurs, the second DC voltage stored in the battery 1000 may be converted into an AC voltage and the converted AC voltage to be output to the third connector 851 as the second output AC voltage.

Thereby, if the plug of the home appliance 900*a* is connected to the third connector 851 during grid power outage, the home appliance 900*a* may be driven by the power supply device 800.

If the plug of an external electronic device is connected to the third connector 851 while grid power outage occurs, the controller 870 may control the received input AC voltage to be output to the third connector 851 as the second output AC voltage as shown in FIG. 6D, or may control the second DC voltage stored in the battery 1000 to be converted into an AC voltage and the converted AC voltage to be output to the third connector 851 as the second output AC voltage as shown in FIG. 6F.

If the voltage level of the battery 1000 is higher than or equal to a second level while the grid power outage occurs and the plug of an electronic device is connected to the third connector 851, the controller 870 may control the second DC voltage stored in the battery 1000 to be converted into an AC voltage and the AC voltage to be output to the third connector 851 as the second output AC voltage as shown in FIG. 6D.

When grid power outage ends, the controller 870 may control the received input AC voltage to be output to the second connector 805 as the first output AC voltage as shown in FIG. 6A.

If the plug of an external electronic device is connected to the third connector 851 when grid power outage ends, the controller 870 may control the received input AC voltage to be output to the third connector 851 as the second output AC voltage as shown in FIG. 6D.

If the plug of an external electronic device is connected to the third connector 851 and the peak value of the input AC voltage is less than or equal to a predetermined value when grid power outage ends, the controller 870 may control the DC voltage stored in the battery 1000 to be converted into an AC voltage and the converted DC voltage to be output to the third connector 851 as the second output AC voltage as shown in FIG. 6F, or may control the AC voltage from the grid to be output to the third connector 851 as the second output AC voltage as shown FIG. 6C.

Figure 7:
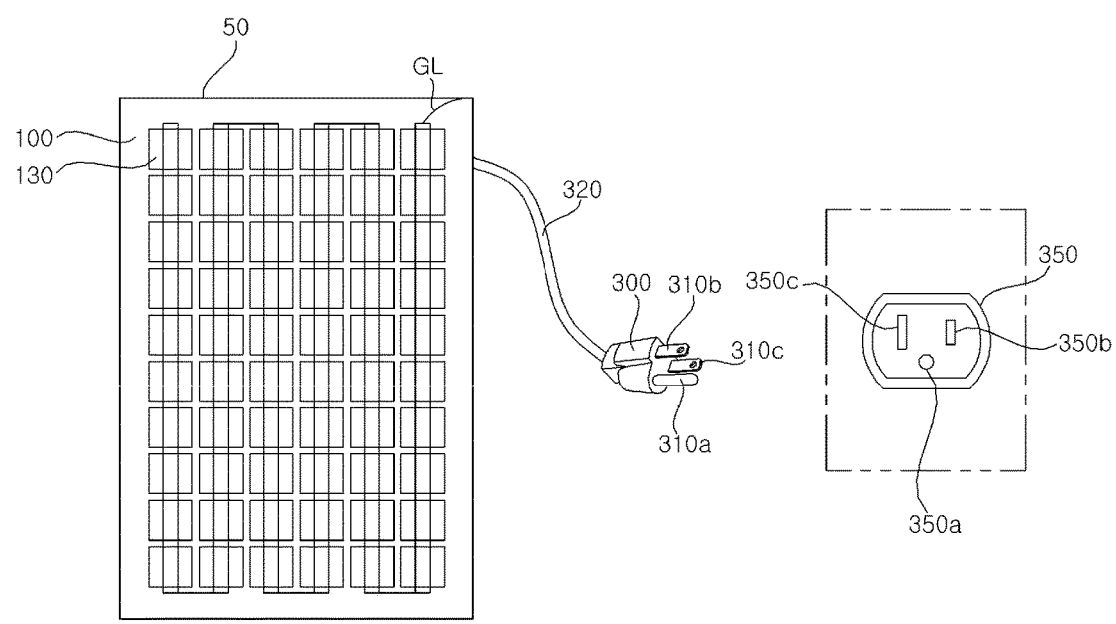
FIG. 7 is a front view illustrating the solar module of FIG. 1.
Figure 8:
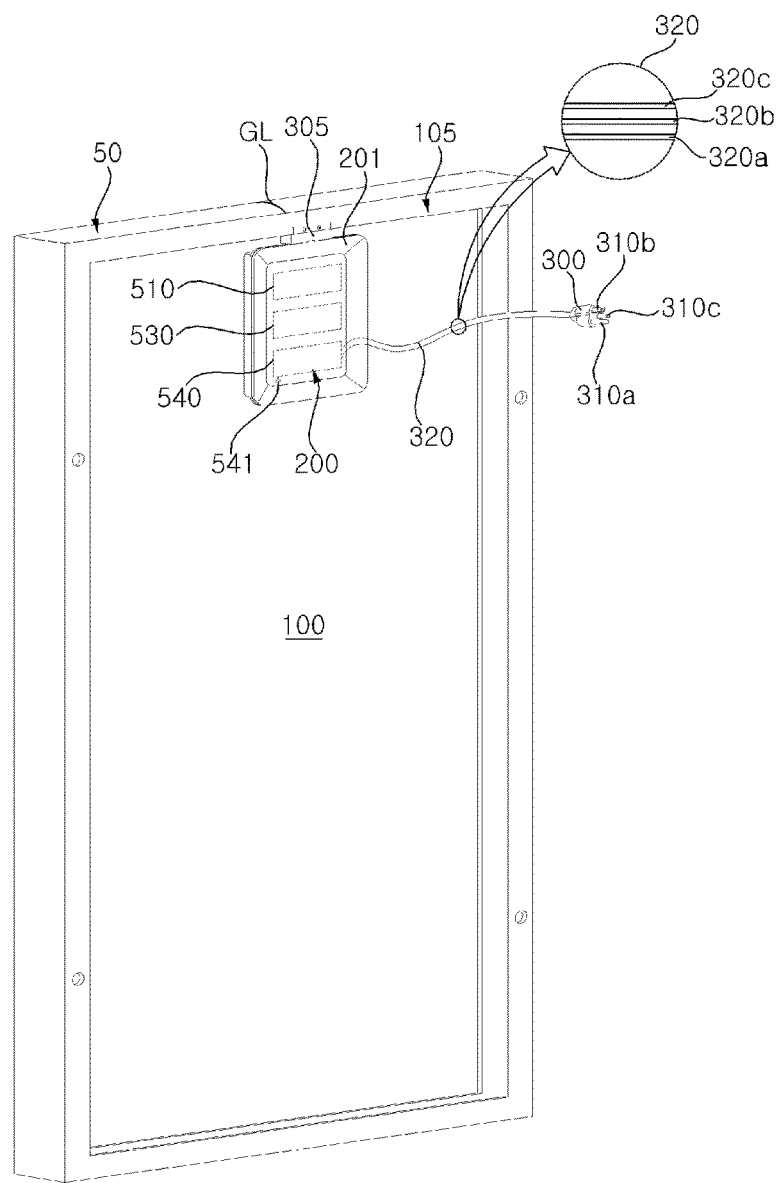
FIG. 8 is a rear view illustrating the solar module of FIG. 7.

FIG. 7 is a front view illustrating the solar module of FIG. 1, and FIG. 8 is a rear view illustrating the solar module of FIG. 7.

Referring to the figures, the solar module 50 of FIG. 1 includes an solar cell module 100 and a junction box 200, which is disposed on the back of the solar cell module 100. The solar module 50 may further include a heat dissipation member (not shown), which is disposed between the solar cell module 100 and the junction box 200.

The solar module 100 may include a plurality of solar cells 130.

The solar cell 130 is a semiconductor device for converting solar energy into electrical energy. The solar cell 130 may be a silicon solar cell, a compound semiconductor solar cell, a tandem solar cell, a dye-sensitized solar cell, a CdTe solar cell, or a CIGS solar cell.

The respective solar cells 130 may be electrically connected in series, in parallel, or in series and parallel.

While it is illustrated in the figure that ten solar cells 130 are connected in a string and six strings are connected in series, various variations may be made to this example.

A ground line (GL) of the solar cell module for ground connection to a DC voltage from the solar cells may be electrically connected to one of the strings.

The GL of the solar cell module may be electrically connected to a frame 105 of the solar cell module 100, which is formed of a conductive member.

In the example of FIG. 8, the GL of the solar cell module is extended to the rear surface of the solar cell module, and electrically connected to the frame 105 of the solar cell module 100, which is formed on the rear surface of the solar cell module 100.

According to an embodiment of the present invention, the solar module 50 may include a solar cell module 100, converter unit 530 for converting a DC voltage from the solar cell module 100, an inverter 540 for converting the DC voltage from the converter into an AC voltage, and a ground terminal 310a. The solar module 50 may include a plug 300 for outputting the AC voltage from the inverter 540.

In particular, an AC power cable 320 may be provided between inverter 540 and the plug 300.

The AC power cable 320 may include three conductive lines. As shown in FIG. 8, the AC power cable 320 may include a first power line 320b, a second power line 320c, and a ground line 320a.

The first power line 320b, the second power line 320c, and the ground line 320a may be electrically connected to a first power terminal 310b, a second power terminal 310c and a ground terminal 310a of the plug 300, respectively.

Herein, the first power terminal 310b, second power terminal 310c, and ground terminal 310a may be a hot terminal, neutral terminal and ground terminal according to the North American standard.

The plug 300 provided with the first power terminal 310b, the second power terminal 310c, and the ground terminal 310a is connectable to the terminals 350a, 350b, 350c of an outlet 350 disposed inside or outside a building. Thereby, the AC voltage from the solar module may be easily supplied to a system through the outlet in the building.

According to the configuration described above, a separate device for connection between the solar module and the outlet is unnecessary, and accordingly user convenience may be enhanced. In particular, a purchaser of the solar module can easily install the solar module in a building and connect the same to the outlet 350 using the plug 300 without assistance from a separate service provider.

For the solar module 50 according to an embodiment of the present invention, the ground 541 of the inverter 540 is electrically connected with the ground terminal 310a of the plug 300.

In the example of FIG. 8, the ground line 320a in the AC power cable 320, which is electrically connected to the ground terminal 310a of the plug 300, is electrically connected to the inverter 540. Preferably, the ground line 320a is electrically connected to the ground terminal 541 of the inverter 540.

Accordingly, there is no need for separately providing a ground to be connected to the ground terminal 541 of the inverter 540.

Referring to FIG. 8, the ground terminal 541 of the inverter 540 may be connected to the frame 201 of the junction box 200, which is formed of a conductive member.

In addition, the frame 201 of the junction box 200 may be electrically connected to the frame 105 of the solar cell module 100 via a conductive member 305.

Thereby, the GL of the solar cell module is electrically connected to the ground terminal 310 of the plug 300 via the frame 105 of the solar cell module 100, the frame 201 of the junction box 200, and the ground terminal 541 of the inverter 540.

Thereby, there is no need for a separate ground to be connected to the GL of the solar cell module.

Meanwhile, the junction box 200 may include a bypass diode unit 510, a converter unit 530, a capacitor C1, an inverter 540, and a controller 550. Details will be described with reference to FIG. 11.

Figure 9:
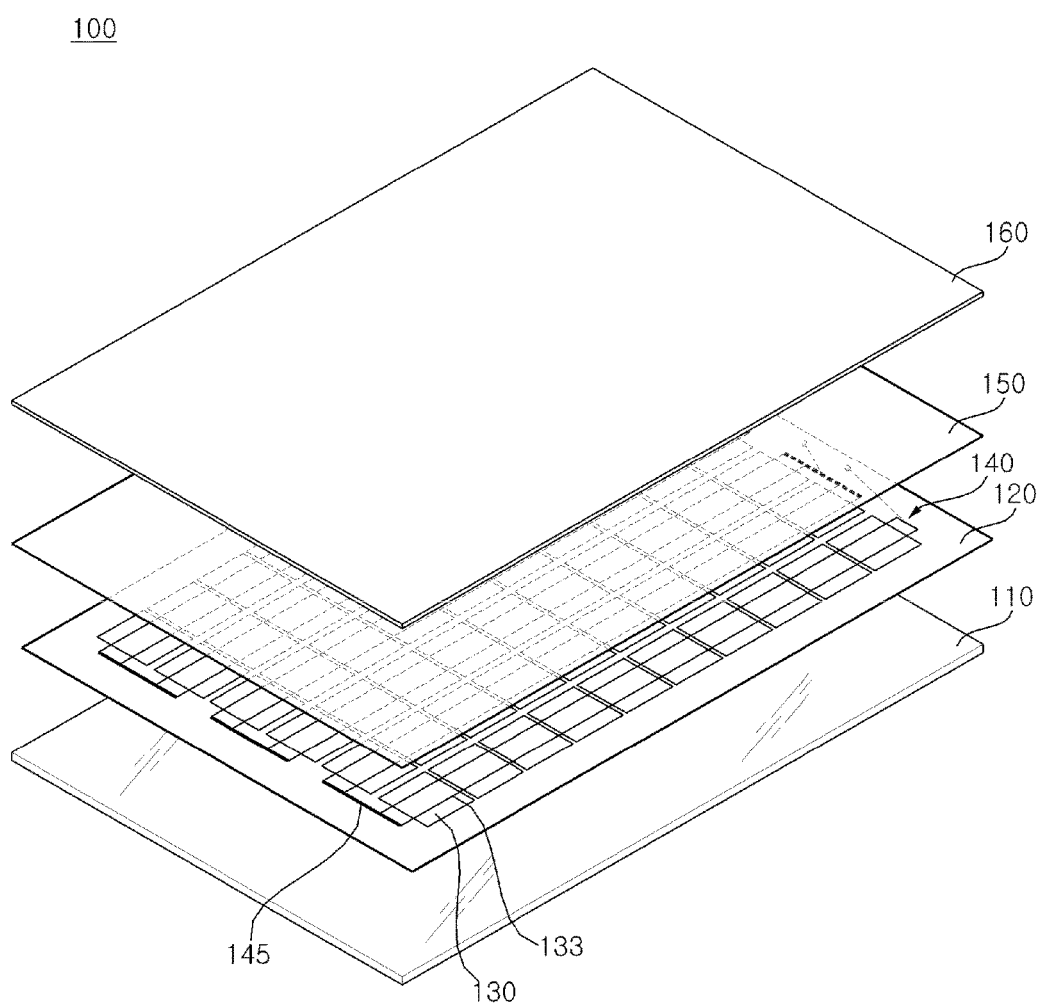
FIG. 9 is an exploded perspective view illustrating a solar cell module of FIG. 8.

FIG. 9 is an exploded perspective view illustrating a solar cell module of FIG. 8.

Referring to FIG. 9, the solar cell module 100 may include a plurality of solar cells 130. The solar cell module 100 may further include a first seal member 120 and second seal member 150, which are positioned on the lower and upper surfaces of the solar cells 130, a rear substrate 110 positioned on the lower surface of the first seal member 120, and a front substrate 160 positioned on the upper surface of the second seal member 150.

The solar cell 130 is a semiconductor device for converting solar energy into electrical energy. The solar cell 130 may be a silicon solar cell, a compound semiconductor solar cell, a tandem solar cell, a dye-sensitized solar cell, a CdTe solar cell, or a CIGS solar cell.

The solar cell 130 has a light receiving surface, on which sunlight is incident, and an opposite surface, which is on the opposite side with respect to the light receiving surface. For example, the solar cell 130 may include a first conductive type silicon substrate, a second conductive type semiconductor layer, which is the opposite type to the first conductive type and formed on the silicon substrate, an anti-reflection film including at least one opening for exposing a part of the surface of the second conductive type semiconductor layer, the anti-reflection film being formed on the second conductive type semiconductor layer, a front surface electrode contacting the part of the surface of the second conductive type semiconductor layer exposed through the at least one opening, and a rear electrode formed on the rear surface of the silicon substrate.

The solar cells 130 may be electrically connected in series, in parallel, or in series and parallel. Specifically, the solar cells 130 may be electrically connected by a ribbon 133. The ribbon 133 may be bonded to the front electrode formed on the light receiving surface of one solar cell 130 and the rear electrode formed on the opposite surface of a neighboring solar cell 130.

In the figure, the ribbon 133 is formed in two rows, and the solar cells 130 are connected in series by the ribbon 133, forming a solar cell string 140. Thereby, six strings 140a, 140b, 140c, 140d, 140e, 140f are formed, and each of the strings includes 10 solar cells. Various variations may be made to the illustrated example.

The rear substrate 110 may have functions of water resist, insulation and blocking of violet rays as a back sheet. However, embodiments of the present invention are not limited thereto. While FIG. 9 illustrates the rear substrate 110 as having a rectangular shape, the rear substrate 110 may have various shapes including a circle and a semicircle depending on the environment where the solar cell module 100 is installed.

A first seal member 120 having the same size as the rear substrate 110 may be attached to the rear substrate 110, and a plurality of solar cells 130 may be positioned neighboring each other in several rows on the first seal member 120.

The second seal member 150 may be positioned on the solar cells 130 and bonded to the first seal member 120 by lamination.

Herein, the first seal member 120 and the second seal member 150 enable the respective elements of the solar cells to be chemically combined. Examples of the first seal member 120 and second seal member 150 may include an ethylene vinyl acetate (EVA) film.

The front substrate 160 is positioned on the second seal member 150 such that sunlight is transmitted therethrough. Preferably, the front substrate 160 is tempered glass to protect the solar cells 130 from shock. More preferably, the front substrate 160 is formed of lower iron tempered glass to prevent reflection of sunlight and increase sunlight transmittance.

Figure 10:
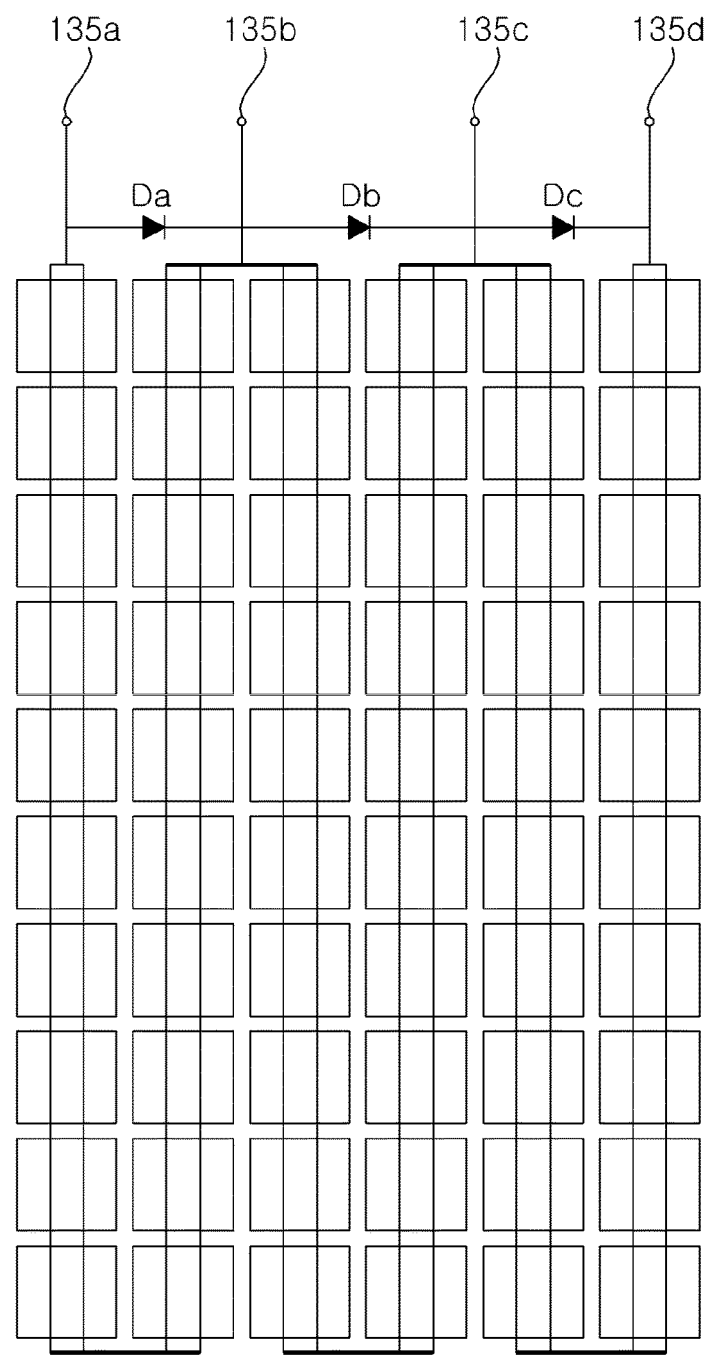
FIG. 10 illustrates an exemplary configuration of bypass diodes of a solar module of FIG. 8.

FIG. 10 illustrates an example configuration of bypass diodes of a solar module of FIG. 8.

Referring to FIG. 10, bypass diodes Da, Db, Dc may be connected to correspond to six solar cell strings 140a, 140b, 140c, 140d, 140e, 140f Specifically, a first bypass diode Da is connected between a first solar cell string and a first bus ribbon 145a. Thereby, when a reverse voltage is generated in the first solar cell string 140a or the second solar cell string 140b, the first bypass diode Da causes the voltage to bypass the first solar cell string 140a and the second solar cell string 140b.

For example, when the voltage generated in a normal solar cell is about 0.6 V, the potential of the cathode of the first bypass diode Da is higher than the potential of the anode of the first bypass diode Da by about 12V (=0.6V×20). That is, the first bypass diode Da operates normally rather than performing the bypass operation.

If any solar cell in the first solar cell string 140a is shaded or a foreign substance is stuck thereto, and thus a hot spot is generated, a reverse voltage of about −15 V rather than about 0.6 V is generated in the solar cell. Thereby, the potential of the anode of the first bypass diode Da becomes higher than the cathode of the first bypass diode Da by about 15 V, and the first bypass diode Da performs the bypass operation. Accordingly, the voltage generated in the solar cells in the first solar cell string 140a and second solar cell strings 140b is not supplied to the junction box 200. By causing the voltage to bypass some solar cells which generate a reverse voltage as described above, the corresponding solar cells may be prevented from being damaged. In addition, DC voltages generated in the areas except the hot spot area may be supplied.

Next, a second bypass diode Db is connected between the first bus ribbon 145a and a second bus ribbon 154b. Thereby, when a reverse voltage is generated in the third solar cell string 140c or the fourth solar cell string 140d, the second bypass diode Db causes the voltage to bypass the third solar cell string 140c and the fourth solar cell string 140d.

Next, a third bypass diode Dc is connected between a sixth solar cell string and the second bus ribbon 145b. Thereby, when a reverse voltage is generated in the fifth solar cell string 140e or the sixth solar cell string 140f, the third bypass diode Dc causes the voltage to bypass the fifth solar cell string 140e and the sixth solar cell string 140f.

In contrast with the example of FIG. 10, six bypass diodes may be connected to correspond to six solar cell strings. Other variations are also possible.

Each of the solar cell strings may be electrically connected by a bus ribbon. In the example FIG. 8, the third to fifth but ribbons 145c, 145d, 145e are disposed at a lower portion of the solar cell module 100 to electrically connect the first solar cell string 140a to the second solar cell string 140b, the third solar cell strings 140c to the fourth solar cell strings 140d, and the fifth solar cell strings 140e to the sixth solar cell strings 140f. In the example FIG. 8, the bus ribbons 145a, 145b are disposed at an upper portion of the solar cell module 100 to electrically connect the second solar cell string 140b to the third solar cell string 140c and the fourth solar cell string 140d to the fifth solar cell string 140e.

The ribbon connected to the first string, the bus ribbons 1145a, 145b, and the ribbon connected to the sixth string are electrically connected to the first to fourth conductive lines 135a, 135b, 135c, 135d. The first to fourth conductive lines 135a, 135b, 135c, 135d are connected to the bypass diodes Da, Db, Dc (see FIG. 9) in the junction box 200, which is disposed on the rear surface of the solar cell module 100. In the figure, it is illustrated that the first to fourth conductive lines 135a, 135b, 135c, 135d extend to the rear surface of the solar cell module 100 through the opening formed on the solar cell module 100.

Preferably, the junction box 200 is disposed closer to the one end of the solar cell module 100 to which the conductive lines extend than the other end of the solar cell module 100.

Figure 11:
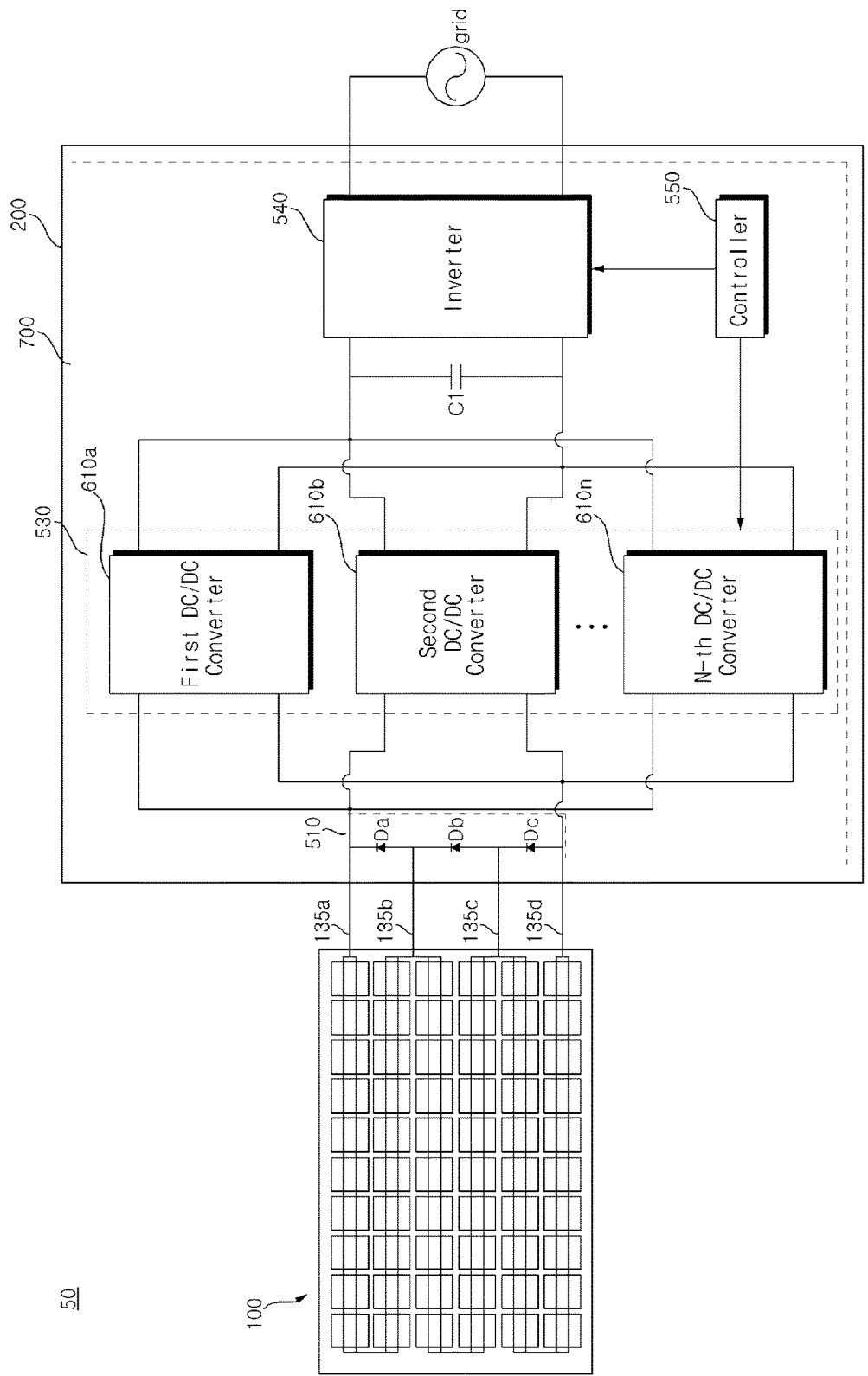
FIG. 11 is an internal block diagram illustrating a junction box of FIG. 8.

FIG. 11 is an internal block diagram illustrating the junction box of FIG. 8.

Referring to FIG. 11, a power conversion module 700 in the junction box 200 may include a bypass diode unit 510, a converter unit 530, a capacitor C1, an inverter 540, and a controller 550.

The bypass diode unit 510 may include bypass diodes Dc, Db, Da, which are respective disposed among the first to fourth conductive lines 135a, 135b, 135c, 135d of the solar cell module 100. Herein, the number of bypass diodes is greater than or equal to 1. Preferably, the number of bypass diodes is less than the number of conductive lines by 1.

The bypass diodes Dc, Db, Da receive solar DC voltages from the solar module 50, in particular, from the first to fourth conductive lines 135a, 135b, 135c, 135d in the solar module 50. In addition, when a reverse voltage is generated by at least one of the first to fourth conductive lines 135a, 135b, 135c, 135d, the bypass diodes Dc, Db, Da may cause the voltages to bypass the corresponding connected line.

An input voltage Vpv delivered via by the bypass diode unit 510 is input to the converter unit 530.

The converter unit 530 converts the input voltage Vpv output from the bypass diode unit 510. The converter unit 530 may be referred to as a first power conversion unit.

For example, the converter unit 530 may convert a DC input voltage Vpv into a pseudo DC voltage. Thereby, the pseudo DC voltage may be stored in the capacitor C1. Both ends of the capacitor C1 may be referred to as DC links, and the capacitor C1 may be referred to as a DC-link capacitor.

As another example, the converter unit 530 may boost the DC input voltage Vpv and convert the same into a DC voltage. Thereby, the DC capacitor C1 may store the boosted DC voltage.

The inverter 540 may convert the DC voltage stored in the DC-link capacitor C1 into an AC voltage. The inverter 540 may be referred to as a second power conversion unit.

For example, the inverter 540 may convert the converted pseudo DC voltage from the converter unit 530 into an AC voltage.

As another example, the inverter 540 may convert the DC voltage boosted by the converter unit 530 into an AC voltage.

Preferably, to implement conversion of the pseudo DC voltage or boosted DC voltage, the converter unit 530 includes a plurality of interleaving converters.

In particular, in an embodiment of the present invention, the converter unit 530 includes three or more interleaving converters.

In the figure, it is illustrated that n converters 610a, 610b, . . . , 610n are connected in parallel. The n converters 610a, 610b, . . . , 610n have the same energy conversion capacity.

A current according to the DC input voltage Vpv decreases to the current divided by N in the n converters 610a, 610b, . . . 610n, and the output currents of the respective converters are combined together at the output terminals of the n converters 610a, 610b, . . . 610n.

The n converters 610a, 610b, . . . 610n perform the interleaving operation, and the current phase of each of the n converters maintains a phase delay of +360°/N, −360°/N or a similar value with respect to a reference phase.

If the n converters are caused to perform the interleaving operation as described above, ripple of the input current and other current of the converter unit 530 may be attenuated, and thus the capacity and size of the circuit devices in the power conversion module 700 may be reduced. Thereby, the thickness of the junction box may become less than the thickness of the frame 105 of the solar cell module.

As the interleaving converter, a tapped inductor converter or a flyback converter may be used.

Figure 12A:
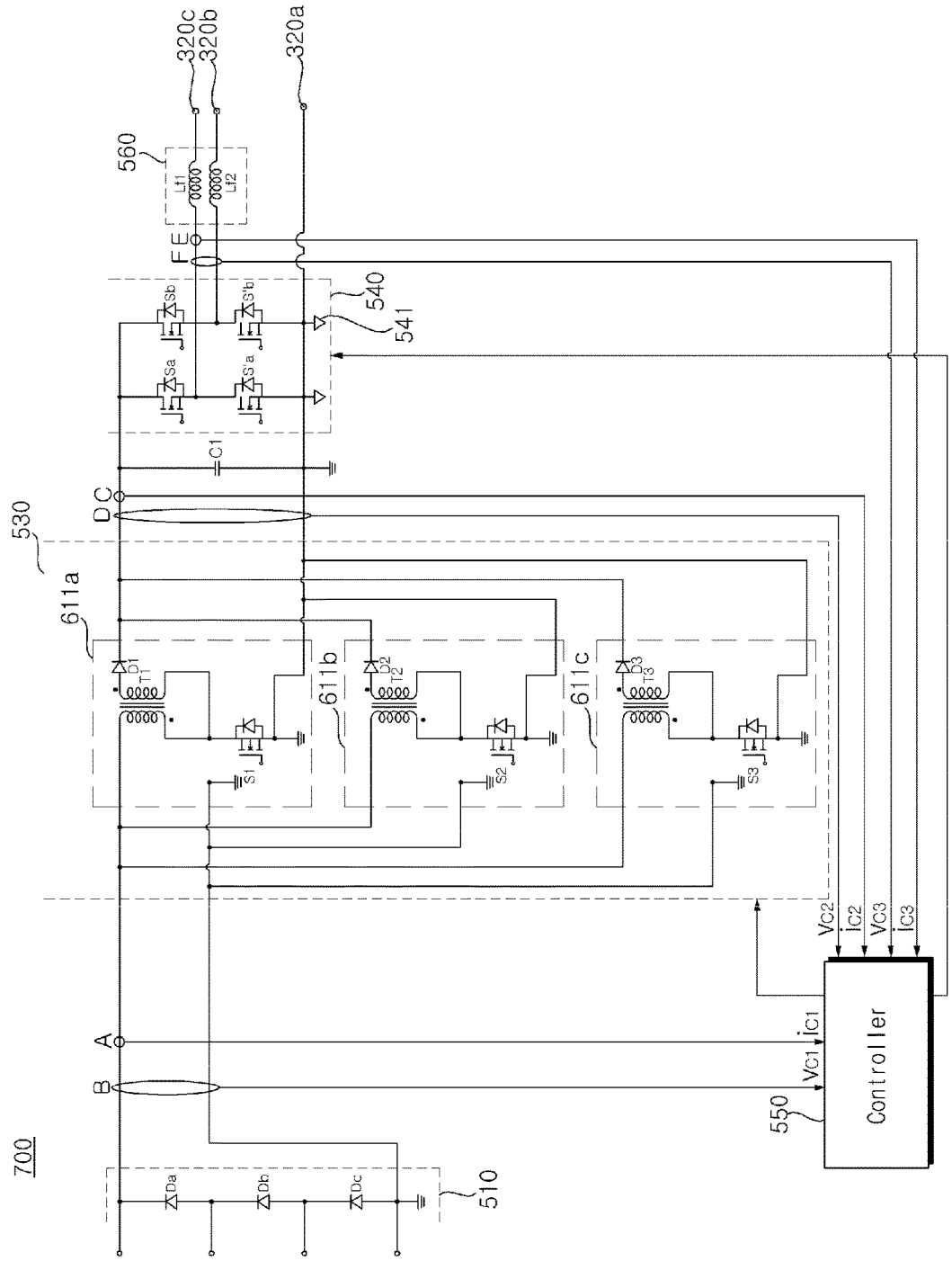
FIG. 12A is an internal circuit diagram illustrating the junction box of FIG. 11.

FIG. 12A is an internal circuit diagram illustrating an example of the junction box of FIG. 11.

FIG. 12A illustrates a tapped inductor converter as an interleaving converter. In the figure, the converter unit 530 includes first to third tapped inductor converters 611a, 611b, 611c.

The bypass diode unit 510 includes first to third bypass diodes Da, Db, Dc, which are disposed among node a, node b, node c, and node d, which correspond to the first to fourth conductive lines 135a, 135b, 135c, 135d.

The converter unit 530 may perform power conversion using the DC voltage Vpv output from the bypass diode unit 510.

In particular, the first to third tapped inductor converters 611a, 611b, 611c output the converted DC voltages to the DC-link capacitor C1 according to the interleaving operation.

The first tapped inductor converter 611a includes a tapped inductor T1, a switching device S1 connected between the tapped inductor T1 and the ground, and a diode D1 connected to the output terminal of the tapped inductor to allow current flow in one direction. The DC-link capacitor C1 is connected is connected between the output terminal of the diode D1, namely the cathode of the diode D1 and the ground.

Specifically, the switching device S1 may be connected between the tap of the tapped inductor T and the ground. The output terminal (secondary side) of the tapped inductor T is connected to the anode of the diode D1, and the DC-link capacitor C1 is connected between the cathode of the diode D1 and the ground.

The primary side and secondary side of the tapped inductor T have opposite polarities. The tapped inductor T may be referred to as a switching transformer.

The primary side and secondary side of the tapped inductor T are connected, as shown in the figure. Thereby, the tapped inductor converter may be a non-insulation type converter.

If the three tapped inductor converters 611a, 611b, 611c are connected in parallel and driven in an interleaving manner as shown in figure, the input current component is branched in parallel, and thus ripple of the current components output from the tapped inductor converters 611a, 611b, 611c is reduced.

Each of tapped inductor converters 611a, 611b, 611c may adaptively operate according to the required power of the output AC voltage.

For example, if the required power is between about 90 W and about 130 W, only the first converter 611a operate. If the required power is between about 190 W and about 230 W, only the first and second converters 611a, 611b may operate. If the required power is between 290 W and about 330 W, all the first to third interleaving converters 611a, 611b, 611c may operate. That is, each of the tapped inductor converters 611a, 611b, 611c may selectively operate. Such selective operation may be controlled by the controller 550.

The inverter 540 converts the DC voltage having a level converted by the converter unit 530 into an AC voltage. In the figure, a full-bridge inverter is illustrated. That is, an upper-arm switching device Sa, Sb is connected to a lower-arm switching device S'a, S'b in series to form one pair, and thus two pairs of upper-arm and lower-arm switching devices are connected in parallel (Sa&S'a, Sb&S'b). Each of the switching devices Sa, S'a, Sb, S'b are connected with a diode in reverse parallel.

The switching devices in the inverter 540 are turned on/off based on an inverter switching control signal from the controller 550. Thereby, an AC voltage having a predetermined frequency is output. Preferably, the predetermined frequency is the same as the AC frequency of the grid (about 60 Hz or 50 Hz).

The filter unit 560 performs low-pass filtering to smooth the AC voltage output from the inverter 540. To this end, indicators Lf1, Lf2 are illustrated in the figure, but other various examples are also possible.

A converter input current sensing unit A senses an input current ic1 input to the converter unit 530, and a converter input voltage sensing unit B senses an input voltage vc1 input to the converter unit 530. The sensed input current ic1 and the input voltage vc1 may be input to the controller 550.

A converter output current sensing unit C senses the output current ic2 of the converter unit 530, namely, the DC-link current, and a converter output voltage sensing unit D senses the output voltage vc2 output from the converter unit 530, namely the DC-link voltage. The sensed output current ic2 and output voltage vc2 may be input to the controller 550.

An inverter output current sensing unit E senses a current ic3 output from the inverter 540, and an inverter output voltage sensing unit F senses a voltage vc3 output from the inverter 540. The sensed current ic3 and voltage vc3 are input to the controller 550.

The controller 550 may output a control signal for controlling the switching device S1 of the converter unit 530 of FIG. 12. In particular, the controller 550 may output a turn-on timing signal of the switching device S1 in the converter unit 530 based on at least one of the sensed input current ic1, input voltage vc1, output current ic2, output voltage vc2, output current ic3, and output voltage vc3.

The controller 550 may output an inverter control signal for controlling each of the switching devices Sa, S'a, Sb, S'b of the inverter 540. In particular, the controller 550 may output a turn-on timing signal of the respective switching devices Sa, S'a, Sb, S'b of the inverter 540 based on at least one of the sensed input current ic1, input voltage vc1, output current ic2, output voltage vc2, output current ic3, and output voltage vc3.

The controller 550 may calculate the point of maximum power for the solar cell module 100, and correspondingly control the converter unit 530 to output a DC power voltage corresponding to the maximum power.

The ground 541 of the inverter 540 is electrically connected to the ground line 320a of the cable 320. A first line of the output lines of the filter unit 560 is electrically connected to the first power line 320b of the cable 320. The second line of the output lines of the filter unit 560 is electrically connected to the second power line 320c of the cable 320.

Figure 12B:
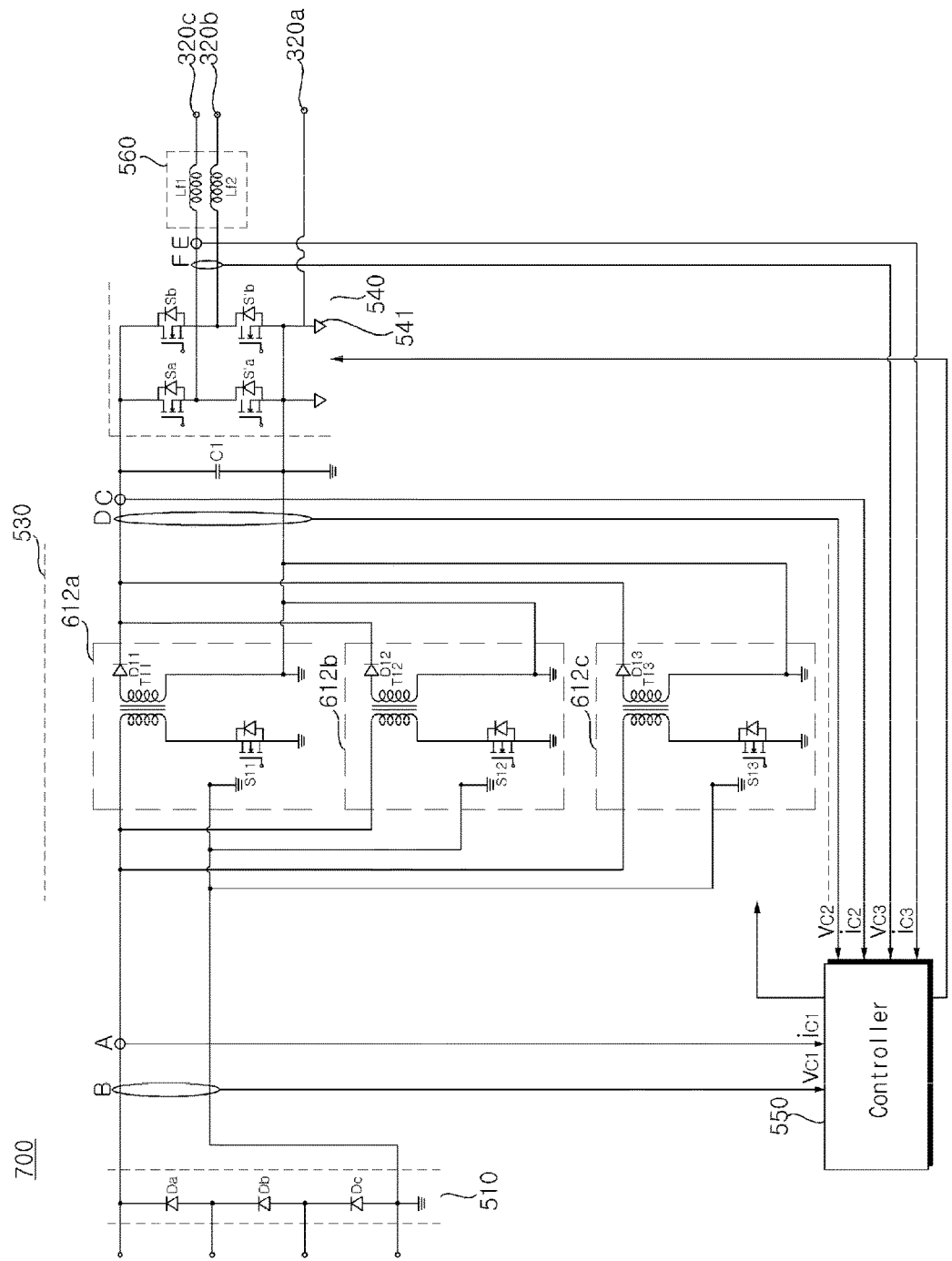
FIG. 12B is another internal circuit diagram illustrating the junction box of FIG. 11.

FIG. 12B is an internal circuit diagram illustrating another example of the junction box of FIG. 11.

Similar to the power conversion module 700 of FIG. 12A, the power conversion module 700 of FIG. 12B may include a bypass diode unit 510, a converter unit 530, a DC-link capacitor C1, an inverter 540, a controller 550, and a filter unit 560.

In FIG. 12B, a flyback converter is illustrated as an interleaving converter in the converter unit 530. In the figure, the converter unit 530 is illustrated as having first to third flyback converters 612a, 612b, 612c.

In particular, the first to third flyback converters 612a, 612b, 612c are insulation type converters, not non-insulation type converters. The first to third flyback converters 612a, 612b, 612c output the converted DC voltages to the DC-link capacitor C1 according to the interleaving operation.

The first flyback converter 612a includes a transformer T11, a switching device S11 connected between the primary side of the transformer T11 and the ground, and a diode D11 connected to the secondary side of the transformer T11 to allow current flow in one direction. The DC-link capacitor C1 is connected between the output terminal of the diode D11, namely the cathode of the diode D11 and the ground. The primary side and secondary side of the transformer T11 have different have opposite polarities.

The ground 541 of the inverter 540 is electrically connected to the ground line 320a of the cable 320. A first line of the output lines of the filter unit 560 is electrically connected to the first power line 320b of the cable 320. A second line of the output lines of the filter unit 560 is electrically connected to the second power line 320c of the cable 320.

Figure 13A:
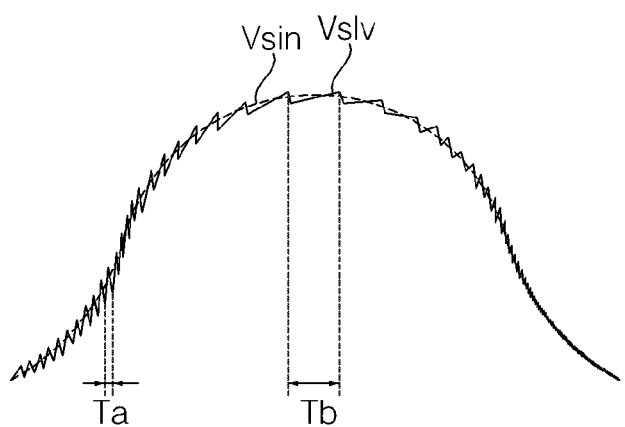
FIGS. 13A and 13B illustrates a case where the water unit of FIG. 11 outputs a pseudo-DC voltage using an input voltage.
Figure 13B:
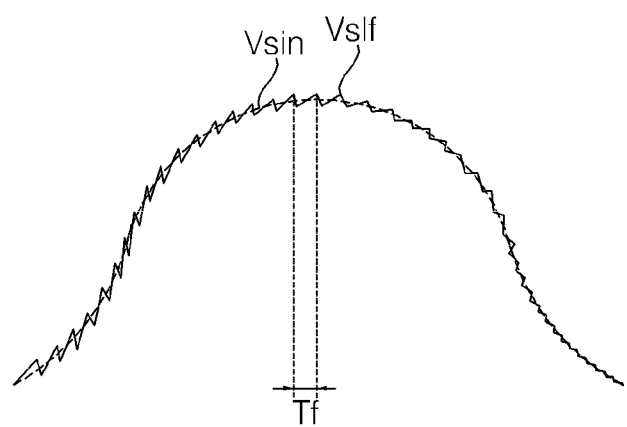

FIGS. 13A and 13B illustrate a case where the converter unit of FIG. 11 outputs a pseudo DC voltage using an input voltage.

Referring to FIG. 13A, the first to third interleaving converters 610a, 610b, 610c in the converter unit 530 output a pseudo DC voltage using an input voltage Vpv, which is a DC voltage.

Specifically, the converter unit 530 outputs a pseudo DC voltage, whose peak value is about 330 V, using a DC voltage between about 32 V and about 36 V from the solar cell module 100.

To this end, the controller 550 determines the duty of the switching devices of the first to third interleaving converters 610a, 610b, 610c based on the detected input voltage Vpv and the detected output voltage Vdc.

In particular, as the input voltage Vpv decreases, the duty of the switching devices of the first to third interleaving converters 610a, 610b, 610c increases. As the input voltage Vpv increases, the duty of the switching devices decreases.

Meanwhile, as a target output voltage Vdc decreases, the duty of the switching devices of the first to third interleaving converters 610a, 610b, 610c decreases. As the target output voltage Vdc increases, the duty of the switching devices increases. For example, if the target output voltage Vdc is about 330 V, which is a peak value, the switching devices may have the highest duty.

FIG. 13A illustrates an output pseudo DC voltage waveform Vslv according to duty variation. The pseudo DC voltage waveform follows a target sinusoidal waveform Vsin.

In the present invention, the switching frequency of the converter unit 530 is varied in order to make the pseudo DC voltage waveform Vslo to more accurately follow the full wave rectification waveform Vsin.

As shown in FIG. 13B, the error ΔE2 between a pseudo DC voltage waveform Vslf and the target sinusoidal waveform Vsin given when the switching frequency of the converter unit 530 is fixed is greater than the error ΔE1 between the pseudo DC voltage waveform Vslv and the target sinusoidal waveform Vsin given when the switching frequency of the converter unit 530 varies.

In the present invention, in order to reduce such error, the switching frequency of the converter unit 530 is varied. That is, the switching frequency of the switching devices of the first to third interleaving converters 610a, 610b, 610c is varied.

The controller 550 may perform a control operation to increase the switching frequency of the converter unit 530 as the change rate of the target sinusoidal waveform Vsin increases.

In the example of FIG. 13A, the switching period is set to Ta in the ascending section of the target sinusoidal waveform Vsin, and is set to Tb, which is less than Ta, in the peak section of the target sinusoidal waveform Vsin. That is, the switching frequency corresponding to the switching period Ta is higher than the switching frequency corresponding to the switching period the Tb. Thereby, the error $\Delta E1$ between the pseudo DC voltage waveform Vslv and the target sinusoidal waveform Vsin may be reduced.

Variation of the switching frequency of FIG. 13A may also be explained in terms of a switching mode of the switching devices. Details will be described with reference to FIGS. 14 and 15.

Figure 14:
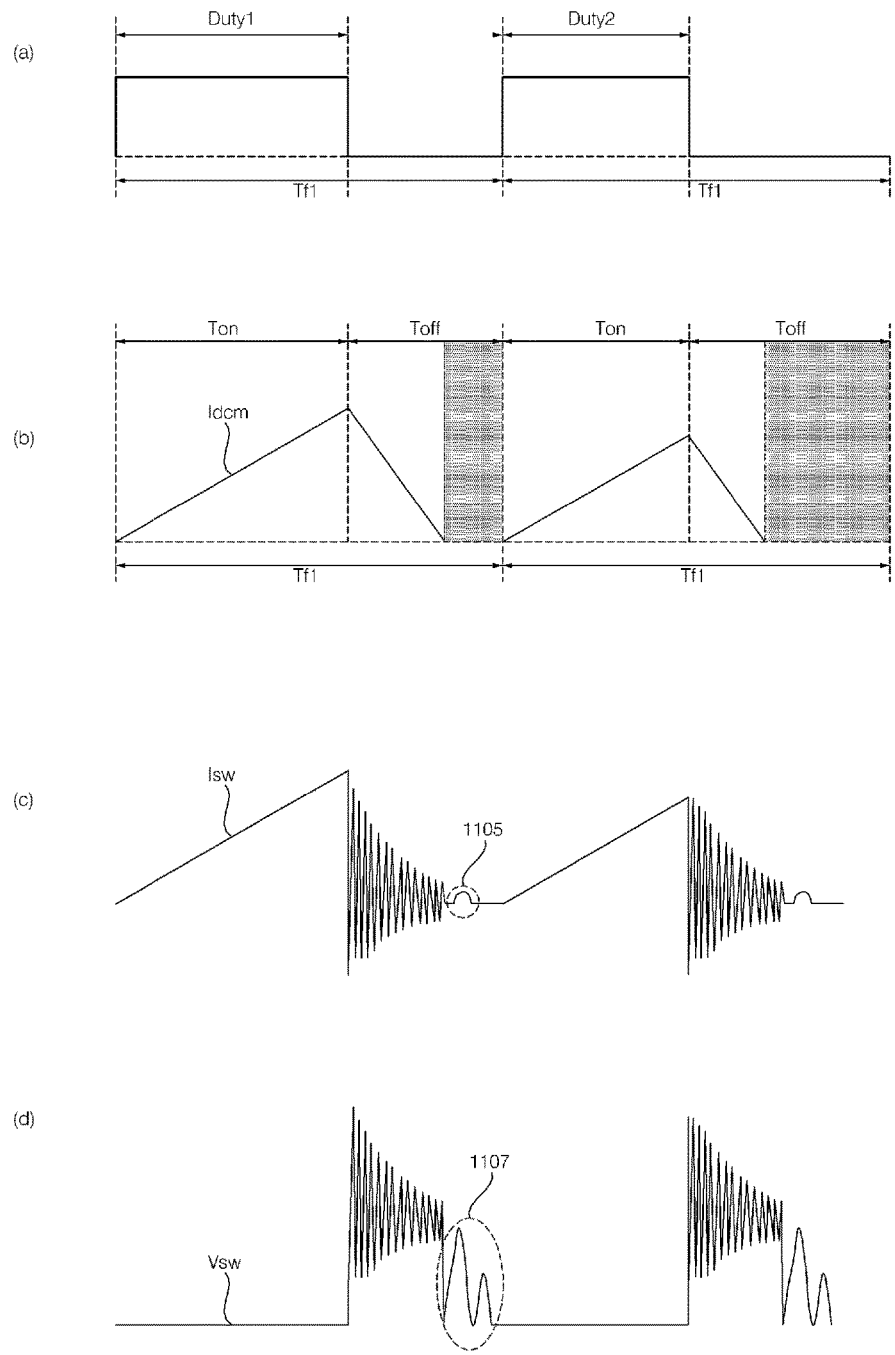
FIGS. 14 and 15 illustrates variation of a switch frequency according to the switching mode of a switch device.
Figure 15:
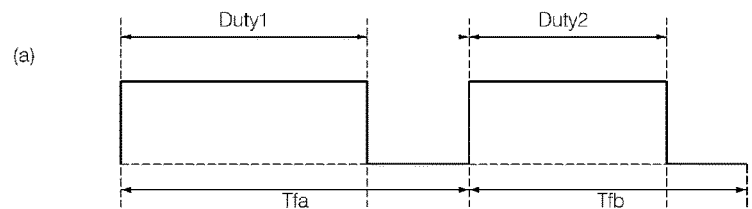
Figure 15:
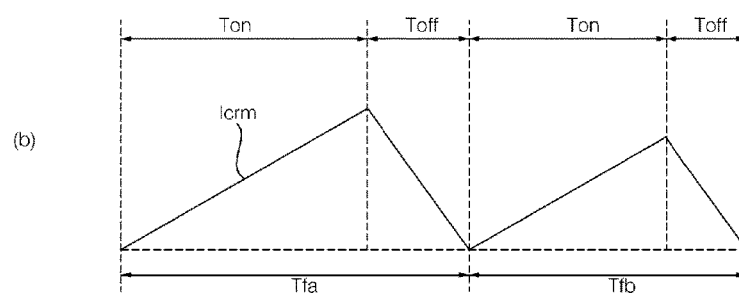
Figure 15:
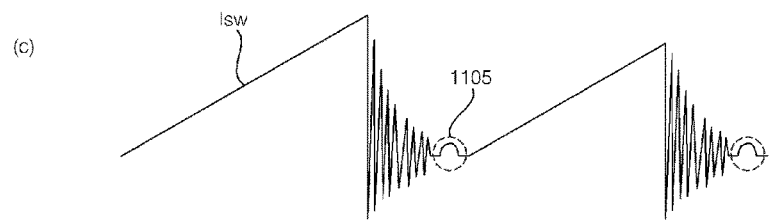
Figure 15:
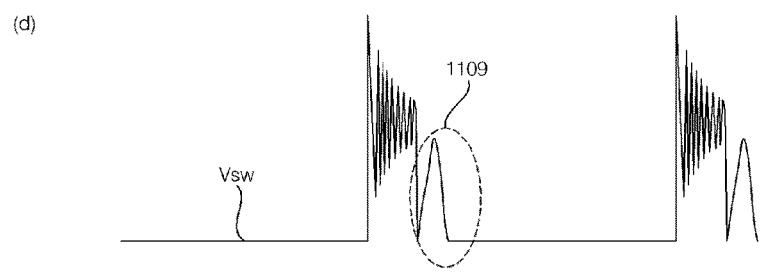

FIGS. 14 and 15 illustrate variation of a switch frequency according to the switching mode of a switch device.

FIG. 14(a) illustrates a duty waveform diagram of a switching device of a interleaving converter. Referring to the figure, the switching device is turned on during duty1 within the a first switching period Tf1, and then turned off. The switching device is turned on during duty2 within a second switching period Tf2, and then turned off. In the figure, duty1 is higher than duty2.

FIG. 14(a) illustrates a case where the switching period of the interleaving converter is fixed, and a discontinuous conduction mode (TCM) is applied as the switching mode.

When the switching period of the interleaving converter is fixed, and the DCM is applied as the switching mode, the current waveform Idcm may flow through the switching device as shown in FIG. 14(b). The current flowing through the switching device increases as the switching device is turned on, and then decreases as the switching device is turned off.

FIG. 14(c) illustrates the waveform of a current that actually flows through a switching device of an interleaving converter according to the DCM, and FIG. 14(d) illustrates a switching voltage at both ends of the switching device of the interleaving converter according to the DCM.

After the switching device is turned off, a resonance section 1105 may be given within the interleaving converter before the next switching period is implemented. In this case, if the switching device operates according to the DCM, a section 1107, in which the switching voltage at both ends of the switching device is not 0 is created. Accordingly, zero voltage switching (ZVS) may not be performed for the switching device, and the efficiency of the interleaving converter may be lowered.

To address this issue, the present invention uses a critical conduction mode (CRM) in place of the DCM as the switching mode. The CRM may also be referred to as a boundary conduction mode (BCM) or a transition mode (TM).

The CRM refers to a mode in which the switching period begins every time the current flowing through the switching device of the interleaving converter becomes 0 after the switching device is turned off. In the CRM, the switching period may vary according to the duty of the switching period.

FIG. 15(a) is a duty waveform diagram illustrating the switching device of an interleaving converter. Referring to FIG. 15(a), the switching device is turned on for duty1 within a first switching period Tfa, and then turned off. The switching device is turned on for duty2 within a second switching period Tfb, and then turned off. In the figure, duty1 is higher than duty2.

FIG. 15(a) illustrates a case where the CRM in which the switching frequency varies is applied as the switching mode as the switching period of the interleaving converter varies according to variation of the duty.

If the CRM in which the switching frequency varies is applied as the switching mode, the waveform of a current Icrm flowing through the switching device may be given as shown in FIG. 15(b). The current flowing through the switching device increases as the switching device is turned on, and then decreases as the switching device is turned off. Then, when the current flowing through the switching device becomes 0, namely when zero crossing occurs, a new switching period begins.

FIG. 15(c) illustrates the waveform of a current that actually flows through a switching device of an interleaving converter according to the CRM, and FIG. 15(d) illustrates a switching voltage at both ends of the switching device of the interleaving converter according to the CRM.

After the switching device is turned off, a resonance section 1105 may be given within the interleaving converter. In this case, if the switching device operates according to the CRM, the time at which the current in the switching device becomes 0, namely, the time at which zero crossing occurs may be determined, and the switching device may be turned on at the corresponding time although the resonance section 1105 is given. That is, a new switching period may begin. Thereby, zero voltage switching (ZVS) may be performed for the switching device, and the efficiency of the interleaving converter may be improved.

Thereby, in the present invention, the switching frequency of the switching device of the interleaving converter varies based on the CRM.

If three interleaving converters 610a, 610b, 610c are used, each of the first to third interleaving converters 610a, 610b, 610c operates with a phase difference.

In the case where a certain phase difference, for example, 120° is set for an operation section of the first to third interleaving converters 610a, 610b, 610c on the condition that the switching frequency varies, output power may be lowered if the switching period increases. Details will be described with reference to FIGS. 16 and 17.

Figure 16:
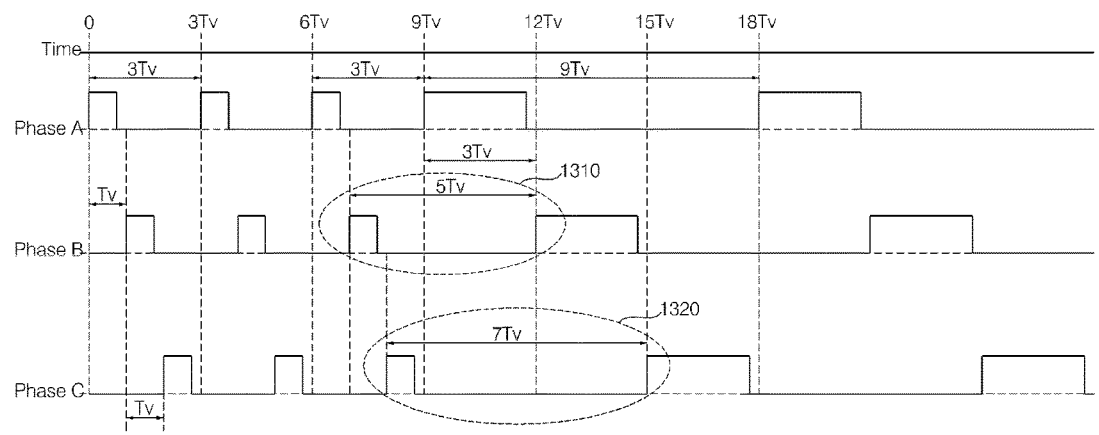
FIG. 16 illustrates a case where three interleaving converters vary the switching frequency and fix the phase difference.

FIG. 16 illustrates a case where three interleaving converters vary the switching frequency and fix the phase difference.

Referring to FIG. 16, the switching period is set to 3Tv in the interval between 0 and 9Tv, and the phase difference between phase a, phase b and phase c of the three interleaving converters 610a, 610b, 610c is Tv.

Next, at time 9Tv, the switching period varies and increase three times to 9Tv. In this case, the first interleaving converter operates for 3TV after 3Tv compared to the previous switching period, while the second interleaving converter operates for 3TV after 5Tv compared to the previous switching period, in consideration of the varied duty (3TV) of the first interleaving converter. The third interleaving converter also operates for 3TV after 7Tv compared to the previous switching period, in consideration of the varied duty 3Tv of the second interleaving converter.

In this case, the phase difference between the first to third interleaving converters is fixed to 120° in despite of variation of the switching period. That is, the second and second interleaving converters operate 3TV and 6TV after the first interleaving converter operates, respectively.

In such switching period variation intervals 1310, 1320, the powers output by the second interleaving converter and the third interleaving converter are decreased below the power output by the first interleaving converter. Accordingly, the output current or output voltage of the converter unit 530 is instantaneously lowered.

According to an embodiment of the present invention, to address this issue, when the switching period varies in a plurality of interleaving converters, the phase for operation section of the interleaving converters is varied in order to address the imbalance between the interleaving converters. Details will be described with reference to FIG. 17.

Figure 17:
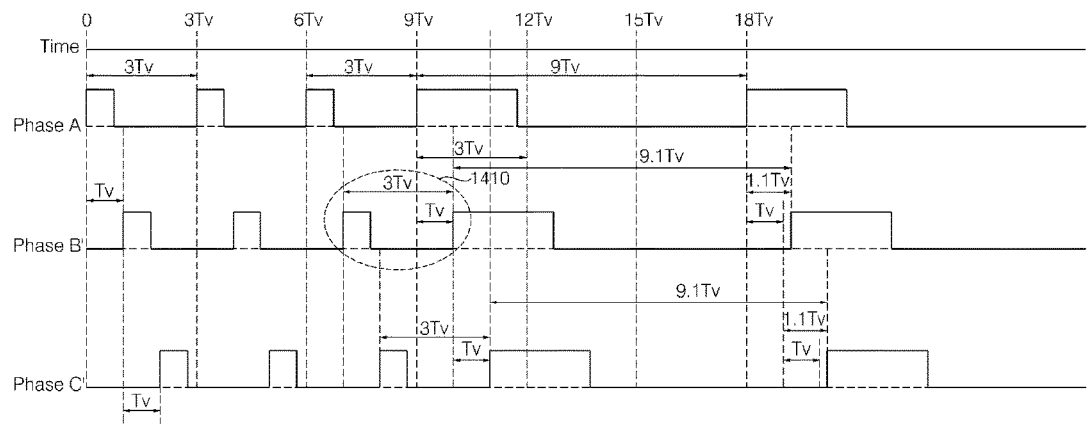
FIG. 17 illustrates a case where three interleaving converters vary the switching frequency and the phase difference.

FIG. 17 illustrates a case where three interleaving converters 610a, 610b, 610c vary the switching frequency and the phase difference.

Referring to FIG. 17, the switching period is set to 3Tv in the interval between 0 and 9Tv, and the phase difference between phase a, phase b and phase c of the three interleaving converters 610a, 610b, 610c is Tv.

Next, at time 9Tv, the switching period varies and increase three times to 9Tv. In this case, the first interleaving converter may operate for 3TV after 3Tv compared to the previous switching period, and the second interleaving converter may operate for the interval of 3TV starting 3Tv after the switching period variation time 9Tv in the switching period variation interval 1410. The third interleaving converter may operate for the interval of 3TV starting 6Tv after the switching period variation time 9Tv.

That is, in contrast with the example of FIG. 16, the controller 550 varies the phase difference between the first to third interleaving converters according to the varied period. According to the figure, the phase difference between the first interleaving converter and the second interleaving converter and the phase difference between the second interleaving converter and the third interleaving converter are varied from 120° to 40°.

When the switching period increases, the controller 550 may vary the phase such that the phase difference between the interleaving converters decreases. Similarly, when the switching period decreases, the controller 550 may vary the phase such that the phase difference between the interleaving converters increases, for example, from 120° to 130°.

When the switching purity increases, the controller 550 may vary the phase such that the operation sections of the respective interleaving converters have an overlapping region of phase. In the figure, for the interval of about 2TV, the operation sections of the first interleaving converter and second interleaving converter overlap.

After variation of the switching period, the first interleaving converter operates for 3TV from time 18Tv, namely 9Tv after the previous switching period, and the second interleaving converter operates for 3TV, namely 9.1Tv after the previous switching period. The third interleaving converter may operate for 3TV, namely 9.1Tv after the previous switching period.

After the varied period, the controller 550 may sequentially change the phase differences among the converters such that the phase differences are close to a reference phase difference. In the figure, the phase difference between the first interleaving converter and the second interleaving converter and the phase difference between the second interleaving converter and the third interleaving converter are increased from 40° to about 41° after time 18TV.

By sequentially changing the phase differences such that the phase differences are close to the original phase difference 120°, current distortion may be prevented, and power output from the second and third interleaving converters may be prevented from being lowered.

Such phase variation is valid only when at least three interleaving converters are operated. If two interleaving converters are used, the phases are preferably fixed to 180°, as shown in FIG. 15.

The switching frequency variation and phase variation illustrated in FIGS. 13A to 17 are applicable to the converter unit 530, in particular, applicable when the converter unit 530 is a tapped inductor converter or flyback converter.

A power supply device and a power supply system including the same according to embodiments of the present invention are not limited to configurations and methods of the embodiments described above. Variations may be made to the embodiments described above by selectively combining all or some of the embodiments.

As is apparent from the above description, according to an embodiment of the present invention, a power supply device and a power supply system including the same include a first connector to receive an input AC voltage, a second connector to output a first output AC voltage to a grid, a third connector connectable with a plug of an external electronic device, a power converter for converting the first DC voltage stored in the battery into an AC voltage, and a controller configured to control the first output AC voltage output, which is based on the input AC voltage, not to be output to the grid when the first output AC voltage is output and grid power outage occurs, control the input AC voltage to be output to the third connector as the second output AC voltage, or control the input AC voltage to be converted into a first DC voltage to be supplied to the battery. Thereby, the input AC voltage generated by the solar module may be utilized when grid power outage occurs.

In particular, if the plug of an external electronic device is connected, the input AC voltage may be output to the third connector as the second output AC voltage. Thereby, even if grid power outage occurs, the external electronic device may stably operate.

When grid power outage occurs, the input AC voltage may be courteously received by causing an AC voltage waveform to be generated in the voltage generator. Thereby, the continuously received input AC voltage may be utilized in various ways when power outage occurs.

When the power outage ends, the received input AC voltage may be output to the second connector as a first output AC voltage or may be converted into a DC voltage and supplied to the battery. Thereby, the input AC voltage may be utilized in various ways when power outage ends.

If the plug of an external electronic device is connected with the third connector when the power outage ends, the received input AC voltage may be output to the third connector as the second output AC voltage. Thereby, the external electronic device may stably operate.

The input AC voltage may be generated by various voltage generation sources. For example, a DC voltage generated from solar cells in a solar module may be converted into the input AC voltage.

The solar module in the power supply system according to an embodiment of the present invention includes a conductive member connected between the frame of the solar module and the frame of a junction box to establish electrical connection between the ground of the solar module and the ground of the junction box including an inverter. Thereby, the installer of the solar module need not build a separate ground for the solar cell module. Accordingly, installation convenience may be secured.

According to another embodiment of the present invention, a power supply device and a power supply system including the same include a first connector to receive an input AC voltage, a second connector to output a first output AC voltage to a grid, a third connector connectable with an external electronic device, a power converter for converting a first DC voltage stored in the battery into an AC voltage, and a controller configured to control the received input AC voltage to be output to the third connector as a second output voltage when the plug of the external electronic device is connected to the third connector during a grid power outage or to control the first DC voltage stored in the battery to be converted into an AC voltage and the converted AC voltage to be output to the third connector as the second output AC voltage. Thereby, when power outage occurs, the AC voltage may be stably supplied to the plug of the external electronic device.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A power supply device comprising:
   a first connector to receive an input alternating current (AC) voltage;
   a second connector to output a first output AC voltage to a grid;
   a third connector connectable with a plug of an external electronic device;
   a voltage conversion unit to convert a first direct current (DC) voltage stored in a battery into an AC voltage; and
   a controller configured to control the first output AC voltage based on the input AC voltage not to be supplied to the grid when grid power outage occurs while the first AC voltage is output to the grid, and control the input AC voltage to be output to the third connector as a second output AC voltage, or control the input AC voltage to be converted into the first DC voltage and the first DC voltage to be supplied to the battery,
   wherein the voltage conversion unit comprises:
      a first switching device to switch electrical connection to the second connector;
      a second switching device to switch electrical connection to the third connector;
      a third switching device to switch electrical connection to the battery;
      an inductor having one end connected to the third switching device;
      a power conversion switching device having one end connected to the inductor;
      a voltage generator to generate an AC voltage waveform;
      a fourth switching device having one end connected to the voltage generator; and
      a fifth switching device having one end connected to the first connector, and
   wherein, when the grid power outage occurs, the controller controls the fourth switching device and the fifth switching device to be turned on in order to continuously receive the input AC voltage.

2. The power supply device according to claim 1, further comprising:
   wherein, when the grid power outage occurs, the controller controls the voltage generator to generate the AC voltage waveform in order to continuously receive the input voltage AC voltage.

3. The power supply device according to claim 1, wherein, when the plug of the external electronic device is connected to the third connector during the grid power outage, the controller controls the received input AC voltage to be output to the third connector as the second output AC voltage, or
   controls a second DC voltage stored in the battery to be converted into an AC voltage and the converted AC voltage to be output to the third connector as the second output AC voltage.

4. The power supply device according to claim 1, wherein, if the plug of the external electronic device is not connected to the third connector during the grid power outage, or a voltage level of the battery is lower than or equal to a first level during the grid power outage, the controller controls the input AC voltage to be converted into the first DC voltage and the converted first DC voltage to be stored in the battery.

5. The power supply device according to claim 1, wherein, if a peak value of the input AC voltage is greater than or equal to a first peak value while the grid power outage occurs and the plug of the external electronic device is connected to the third connector, the controller controls the input AC voltage to be output to the third connector as the second output AC voltage, or
   wherein, if a voltage level of the battery is higher than or equal to a second level while the grid power outage occurs and the plug of the external electronic device is connected to the third connector, the controller controls a second DC voltage stored in the battery to be converted into an AC voltage and the converted AC voltage to be output to the third connector as the second output AC voltage.

6. The power supply device according to claim 1, further comprising:
   a switch to perform a switching operation to electrically connect or insulate the second connector and the voltage conversion unit,
   wherein, when the grid power outage occurs, the controller controls the switch to be turned off.

7. The power supply device according to claim 6, wherein, when a peak value of the AC voltage of the grid is less than or equal to a second peak value, the controller controls the switch to be turned off.

8. The power supply device according to claim 1, wherein, when the grid power outage ends, the controller controls the received input AC voltage to be output to the second connector as the first output AC voltage.

9. The power supply device according to claim 8, wherein, if a peak value of the AC voltage of the input AC voltage is less than or equal to a predetermined value when the grid power outage ends, the controller controls a DC voltage stored in the battery to be converted into an AC voltage and the converted AC voltage to be output to the grid as the first output AC voltage.

10. The power supply device according to claim 1, wherein, if the plug of the external electronic device is connected to the third connector when the grid power outage ends, the controller controls the received input AC voltage to be output to the third connector as the second output AC voltage.

11. The power supply device according to claim 9, wherein, if the plug of the external electronic device is connected to the third connector and the peak value of the input AC voltage is less than or equal to a predetermined value when the grid power outage ends,
   the controller controls the DC voltage stored in the battery to be converted into an AC voltage and the converted the AC voltage to be output to the third connector as the second output AC voltage, or controls an AC voltage from the grid to be output to the third connector as the second output AC voltage.

12. A power supply device comprising:
a first connector to receive an input alternating current (AC) voltage;
a second connector to output a first output AC voltage to a grid;
a third connector connectable with a plug of an external electronic device;
a voltage conversion unit to convert a first direct current (DC) voltage stored in a battery into an AC voltage;
a controller configured to control, when the plug of the external electronic device is connected to the third connector during a grid power outage, the received input AC voltage to be output to the third connector as the second output AC voltage, or a second DC voltage stored in the battery to be converted into the AC voltage and the converted AC voltage to be output to the third connector as the second output AC voltage,
wherein the voltage conversion unit comprises:
 a first switching device to switch electrical connection to the second connector;
 a second switching device to switch electrical connection to the third connector;
 a third switching device to switch electrical connection to the battery;
 an inductor having one end connected to the third switching device;
 a power conversion switching device having one end connected to the inductor;
 a voltage generator to generate an AC voltage waveform;
 a fourth switching device having one end connected to the voltage generator; and
 a fifth switching device having one end connected to the first connector, and
wherein, when the grid power outage occurs, the controller controls the fourth switching device and the fifth switching device to be turned on in order to continuously receive the input AC voltage.

13. A power supply system comprising:
a solar module having a solar cell module comprising a solar cell for generating a direct current (DC) voltage;
a power supply device to output a first output alternating current (AC) voltage to a grid based on a converted input AC voltage based on the DC voltage or to, when a plug of an external electronic device is connected, output the input AC voltage as a second output AC voltage or convert the input AC voltage into a first DC voltage and output the first DC voltage,
wherein, when grid power outage occurs, the power supply device does not supply the first output AC voltage based on the input AC voltage to the grid, but outputs the input AC voltage as the second output AC voltage or converts the input AC voltage into the first DC voltage and supply the first DC voltage to the battery,
wherein the power supply device comprising:
 a first connector to receive the input AC voltage;
 a second connector to output the first output AC voltage to the grid;
 a third connector connectable with a plug of an external electronic device;
 a voltage conversion unit to convert the first DC voltage stored in the battery into an AC voltage;
wherein the voltage conversion unit comprises:
 a first switching device to switch electrical connection to the second connector;
 a second switching device to switch electrical connection to the third connector;
 a third switching device to switch electrical connection to the battery;
 an inductor having one end connected to the third switching device;
 a power conversion switching device having one end connected to the inductor;
 a voltage generator to generate an AC voltage waveform;
 a fourth switching device having one end connected to the voltage generator; and
 a fifth switching device having one end connected to the first connector, and
wherein, when the grid power outage occurs, the controller controls the fourth switching device and the fifth switching device to be turned on in order to continuously receive the input AC voltage.

14. The power supply system according to claim 13, wherein the solar module further comprises:
a converter unit to convert the DC voltage from the solar cell module; and
an inverter to convert the DC voltage from the converter unit into the input AC voltage.

15. The power supply system according to claim 14, wherein the solar module further comprises:
a plug comprising a ground terminal, the plug being configured to output the AC voltage from the inverter,
wherein the ground terminal is electrically connected to a ground of the inverter,
wherein a ground of the solar cell module is electrically connected to the ground of the inverter.

16. The power supply system according to claim 14, wherein the solar module further comprises:
a conductive member connected between a frame of the solar cell module and a frame of a junction box in order to electrically connect a ground of the solar cell module and a ground of the junction box, the junction box comprising the inverter.

17. The power supply system according to claim 16, wherein the frame of the junction box is electrically connected to the ground of the inverter.

18. The power supply system according to claim 13, further comprising:
an inverter device to convert the DC voltage from the solar module into the input AC voltage.

* * * * *